(12) United States Patent
Ueki et al.

(10) Patent No.: US 8,521,977 B2
(45) Date of Patent: Aug. 27, 2013

(54) INFORMATION PROCESSING APPARATUS AND ACCESS CONTROL METHOD

(71) Applicant: Fujitsu Limited, Kawasaki (JP)

(72) Inventors: Toshikazu Ueki, Yokohama (JP); Seishi Okada, Kawasaki (JP); Hideyuki Koinuma, Yokohama (JP); Go Sugizaki, Machida (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/654,274

(22) Filed: Oct. 17, 2012

(65) Prior Publication Data

US 2013/0173867 A1 Jul. 4, 2013

Related U.S. Application Data

(63) Continuation of application No. 13/606,054, filed on Sep. 7, 2012.

(30) Foreign Application Priority Data

Dec. 28, 2011 (JP) ................................ 2011-290025

(51) Int. Cl.
*G06F 12/00* (2006.01)
(52) U.S. Cl.
USPC ........................................................ 711/163
(58) Field of Classification Search
None
See application file for complete search history.

(56) References Cited

U.S. PATENT DOCUMENTS

| | | | |
|---|---|---|---|
| 5,163,096 A | 11/1992 | Clark et al. | |
| 5,619,671 A * | 4/1997 | Bryant et al. | 711/202 |
| 5,900,019 A * | 5/1999 | Greenstein et al. | 711/164 |
| 6,212,610 B1 * | 4/2001 | Weber et al. | 711/164 |
| 6,510,496 B1 | 1/2003 | Tarui et al. | |
| 6,981,097 B2 * | 12/2005 | Martin et al. | 711/130 |
| 7,536,524 B2 * | 5/2009 | Shaath et al. | 711/163 |
| 7,581,074 B2 | 8/2009 | Greiner | |
| 7,742,604 B2 * | 6/2010 | Yamagata et al. | 380/270 |
| 7,886,156 B2 * | 2/2011 | Franchi | 713/186 |
| 8,060,716 B2 * | 11/2011 | Ito et al. | 711/163 |
| 8,086,585 B1 * | 12/2011 | Brashers et al. | 707/705 |
| 8,185,709 B2 * | 5/2012 | Kim | 711/163 |
| 2003/0177367 A1 * | 9/2003 | King et al. | 713/185 |
| 2007/0130434 A1 * | 6/2007 | Chu et al. | 711/163 |
| 2007/0283125 A1 * | 12/2007 | Manczak et al. | 711/207 |

FOREIGN PATENT DOCUMENTS

| | | |
|---|---|---|
| JP | 5-204762 | 8/1993 |
| JP | 4123621 B2 | 7/2008 |
| JP | 2009-537879 | 10/2009 |
| WO | 2007/134646 | 11/2007 |

* cited by examiner

*Primary Examiner* — Hiep Nguyen
(74) *Attorney, Agent, or Firm* — Fujitsu Patent Center

(57) ABSTRACT

An information processing apparatus includes nodes having a first node and a second node each of which includes a processor and a memory in which at least a part of area is set as a shared memory area, and an interconnect that connects the nodes. The first node transmits communication data to be transmitted to the second node by attaching identification information used for accessing a memory in the second node. The second node determines whether or not an access to the shared memory area in the memory in the second node is permitted on the basis of the identification information that is attached to the communication data transmitted from the first node and identification information stored in a storing unit and used for controlling permission to access, from another node, the shared memory area in the memory in the second node.

16 Claims, 31 Drawing Sheets

FIG.6

| SEGMENT NUMBER | USE FLAG | APPLI-CATION ID | USE NODE FLAG | | | | | TOKEN |
|---|---|---|---|---|---|---|---|---|
| | | | 1 | 2 | 3 | ... | m | |
| 0 | 1 | 100 | 1 | x | 0 | ... | 0 | 3015 |
| 1 | 1 | 100 | 1 | | 0 | ... | 0 | 2156 |
| 2 | 0 | x | x | | x | ... | x | x |
| 3 | 1 | 150 | 0 | | 1 | ... | 1 | all 0 |
| ⋮ | ⋮ | ⋮ | ⋮ | | ⋮ | ... | ⋮ | ⋮ |
| 2047 | 0 | x | x | x | x | ... | x | all 0 |

FIG.7

| MEMORY TOKEN VALUE | USE FLAG | APPLI-CATION ID |
|---|---|---|
| 0 | 1 | 100 |
| 1 | 1 | 100 |
| 2 | 0 | x |
| 3 | 1 | 150 |
| ⋮ | ⋮ | ⋮ |
| 4095 | 0 | x |

FIG.12

| FORMAT | DESTI-NATION ID | OPERA-TION CODE | TRANSMISSION SOURCE ID | ENTRY ID | TOKEN | TARGET ADDRESS |

FIG.13

| OPERATION CODE | OPERATION CODE NAME | TOKEN ENABLE | MEANING OF OPERATION CODE |
|---|---|---|---|
| 0000 | READ IF | 1 | READ INSTRUCTION AREA FROM CORE, ACQUIRE CACHE IN S STATE |
| 0001 | READ OP | 1 | READ DATA AREA FROM CORE, ACQUIRE CACHE IN S/E STATE |
| 0010 | READ EX | 1 | READ EXCLUSION-RIGHT ACQUISITION TO STORE FROM CORE, ACQUIRE CACHE IN S/E STATE |
| 0100 | DMA Read | | READ DMA FROM IO, DOES NOT ACQUIRE CACHE |
| 0110 | DMA Write | | WRITE DMA FROM IO (128B FULL), DOES NOT ACQUIRE CACHE |
| 0111 | DMA Write Partial | 0 | WRITE DMA FROM IO (PARTIAL), DOES NOT ACQUIRE CACHE |
| 1000 | Write Back | | WRITE BACK M DATA AT TIME OF CPU CACHE EVICTION |
| 1001 | Flash Back | | CHANGE NOTIFICATION FROM S/E STATE TO I AT TIME OF CPU CACHE EVICTION |
| 1010 | Cache Flush | | CACHE FLUSH REQUEST FROM CORE |

FIG.14

| MY Node HIT | TOKEN ENABLE | TOKEN MATCH | ACCESS FREE | PERMITTED/NOT PERMITTED |
|---|---|---|---|---|
| NO | YES | NO | NO | NOT PERMITTED |
| OTHERS | | | | PERMITTED |

FIG.15

| PERMITTED/NOT PERMITTED | TARGET ADDRESS CHECKER | HOME STATE MACHINE |
|---|---|---|
| NOT PERMITTED | OPTIONAL | EXECUTE ACCESS EXCEPTION OPERATION |
| PERMITTED | MISS | EXECUTE ACCESS EXCEPTION OPERATION |
| | HIT | EXECUTE ACCESS |

FIG.28

| SEGMENT NUMBER | USE FLAG | APP | USE NODE FLAG | | | | | TOKEN |
|---|---|---|---|---|---|---|---|---|
| | | | 1 | 1 | 2 | ... | m | |
| 0 | 1 | 100 | 1 | | 0 | ... | 0 | 0 |
| 1 | 1=>0 | 100 | 1=>0 | x | 0 | ... | 0 | 1 |
| 2 | 0 | x | x | | x | ... | x | x |
| 3 | 1 | 150 | 0 | | 1 | ... | 1 | 3 |
| ⋮ | ⋮ | ⋮ | ⋮ | | ⋮ | ... | ⋮ | ⋮ |
| 2047 | 0 | x | x | x | x | ... | x | x |

FIG.29

| MEMORY TOKEN VALUE | USE FLAG | APP |
|---|---|---|
| 0 | 1 | 100 |
| 1 | 1=>0 | 100 |
| 2 | 0 | x |
| 3 | 1 | 150 |
| ⋮ | ⋮ | ⋮ |
| 4095 | 0 | x |

INFORMATION PROCESSING APPARATUS AND ACCESS CONTROL METHOD

CROSS-REFERENCE TO RELATED APPLICATION

This application is based upon and claims the benefit of priority of the prior Japanese Patent Application No. 2011-290025, filed on Dec. 28, 2011, the entire contents of which are incorporated herein by reference.

FIELD

The embodiments discussed herein are directed to an information processing apparatus and an access control method.

BACKGROUND

A conventional information processing system is known that has a cluster configuration in which multiple nodes each having at least a CPU and a memory are connected using a LAN or InfiniBand and Operating Systems (OSs) included in the nodes are executed. With an information processing system having this cluster configuration, each of CPUs shares a memory in a node and executes processes in parallel.

FIG. 33 is a schematic diagram illustrating an information processing system having a cluster configuration. In the example illustrated in FIG. 33, the information processing system includes nodes 50 to 52 that are connected by a LAN or the InfiniBand with each other. The node 50 includes a memory 50a, an OS 50b, and a central processing unit (CPU) 50c. Similarly, the node 51 includes a memory 51a, an OS 51b, and a CPU 51c. The node 52 includes a memory 52a, an OS 52b, and a CPU 52c.

The nodes 50 to 52 executes the OS 50b to 52b, respectively, and each of the OS 50b to 52b is independent in each node, thereby preventing a failure occurring in one of the OSs 50b to 52b from being propagated to the entire information processing system. Furthermore, one or more CPUs 50c to 52c included in the nodes 50 to 52, respectively, share the memories 50a to 52a in each node and access, via the LAN or the InfiniBand, the memory included in the other node.

FIG. 34 is a schematic diagram illustrating memory access between nodes. For example, the node 50 transmits memory access request issued by an application, which is running in the node 50, to the node 51 via a driver, the OS, and hardware. By doing so, the node 51 reports the request received from the node 50 to an application in the node 51 via the hardware, the OS, and the driver and allows the application to execute the memory access.

At this point, in the information processing system having a cluster configuration, because the memory access is executed via the application in the node to be accessed, the latency of the memory access increases and thus the architecture of the application is complicated. Accordingly, there is a known information processing system having a shared memory configuration in which multiple nodes are connected by an interconnection and the application in each node directly accesses memories that perform mapping onto the same memory address space.

FIG. 35 is a schematic diagram illustrating an information processing system that uses a shared memory configuration technology. In the example illustrated in FIG. 35, a node 53 is connected to a node 54 by an interconnect and a remote memory is mapped on an address space that can be directly accessed by the application executed by each of the node 53 and the node 54. The applications executed by the nodes 53 and 54 each issue memory access request with respect to the remote memory, similarly to the memory access with respect to the memory in each node.

Furthermore, there is a known technology for preventing, by setting a storage key for accessing a memory storage area, an unauthorized access to a memory area that is not to be accessed by an application. FIG. 36 is a schematic diagram illustrating a function for preventing unauthorized memory access. For example, in the example illustrated in FIG. 36, an OS previously sets a 4-bit storage key in the memory area for 2 kilobytes or 4 kilobytes. Furthermore, when the OS sets a program counter, the OS sets, in a program status word, a storage key for the memory area used by the application as an access key.

Then, an instruction unit reads the program counter and issues memory access request to memory access unit. Furthermore, when the memory access unit obtains the memory access request from the instruction unit, the memory access unit determines whether the access key that is set in the program status word matches the storage key.

If the memory access unit determines that the storage key does match the access key, the memory access unit permits the memory access and outputs, to the instruction unit, data that is stored in the memory area to be accessed. Furthermore, if the storage key does not match the access key, the memory access unit does not permit the memory access and prevents unauthorized access to the memory area that is not to be accessed by the application.

Patent Document 1: Japanese National Publication of International Patent Application No. 2009-537879
Patent Document 2: Japanese Laid-open Patent Publication No. 05-204762
Patent Document 3: Japanese Laid-open Patent Publication No. 2000-235558

However, there is a problem in that, when a failure occurs in an application executed by a node and thus communication is impossible with the other node, the information processing system having the shared memory configuration described above does not correctly perform a failover in which a process to be performed by the failed node is shifted to the other node.

In the following, a description will be given of a case, with reference to FIGS. 37A and 37B, in which a failover is not correctly performed. FIG. 37A is a first schematic diagram illustrating an example in which a failover is not normally performed. FIG. 37B is a second schematic diagram illustrating an example in which a failover is not normally performed. In the example illustrated in FIGS. 37A and 37B, a description will be given of a case in which a problem has occurred in the application executed by a node 55 and thus communication is impossible with the other node.

For example, as illustrated in FIG. 37A, a node 56 receives memory access from the application executed by the node 55; however, because the communication with the node 55 is impossible, the node 56 determines that the node 55 has failed. In such a case, as illustrated in FIG. 37B, a failover is executed in which the process executed by the node 55 is shifted to a node 57.

However, because the node 56 is not able to communicate with the node 55, the node 56 does not allow memory access performed from the node to be stopped the memory access from the node 55. Accordingly, a split brain state occurs in which both the node 55 and the node 57 simultaneously execute the application in the corresponding nodes 55 and 57, and thus a failover is not correctively performed.

Accordingly, it is conceivable that access can be prevented to a memory in a node from another node by using a technology for setting a storage key described above in the information processing system having the shared memory configuration and by changing the storage key. However, with the technology for setting the storage key described above, a single OS sets both a storage key and an application key. Accordingly, when executing OSs in different nodes, i.e., a node of memory access source and a node to be accessed, because the storage key is not changed, it is difficult to prevent access from the failed node.

SUMMARY

According to an aspect of an embodiment, an information processing apparatus includes a plurality of nodes having a first node and a second node each of which includes a processor and a memory in which at least a part of area is set as a shared memory area and an interconnect that connects the nodes. The first node includes a processor executing transmitting communication data to be transmitted to the second node by attaching identification information stored in a first storing unit and used for accessing a memory in the second node. The second node includes a processor executing determining whether or not an access to the shared memory area in the memory in the second node is permitted on the basis of the identification information that is attached to the communication data transmitted from the first node and identification information stored in a second storing unit and used for controlling permission to access, from another node, the shared memory area in the memory in the second node.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a schematic diagram illustrating a shared memory segment management table according to the first embodiment;

FIG. 7 is a schematic diagram illustrating a memory token management table according to the first embodiment;

FIG. 12 is a schematic diagram illustrating an example of a memory access request;

FIG. 13 is a schematic diagram illustrating an example of processes indicated by operation codes;

FIG. 14 is a schematic diagram illustrating an example of a determination performed by an access determination controller;

FIG. 15 is a schematic diagram illustrating the contents of processes executed by a home state machine;

FIG. 28 is a schematic diagram illustrating an update of the shared memory segment management table;

FIG. 29 is a schematic diagram illustrating an update of the memory token management table;

DESCRIPTION OF EMBODIMENTS

Preferred embodiments of the present invention will be explained with reference to accompanying drawings.

[a] First Embodiment

Figure 1:
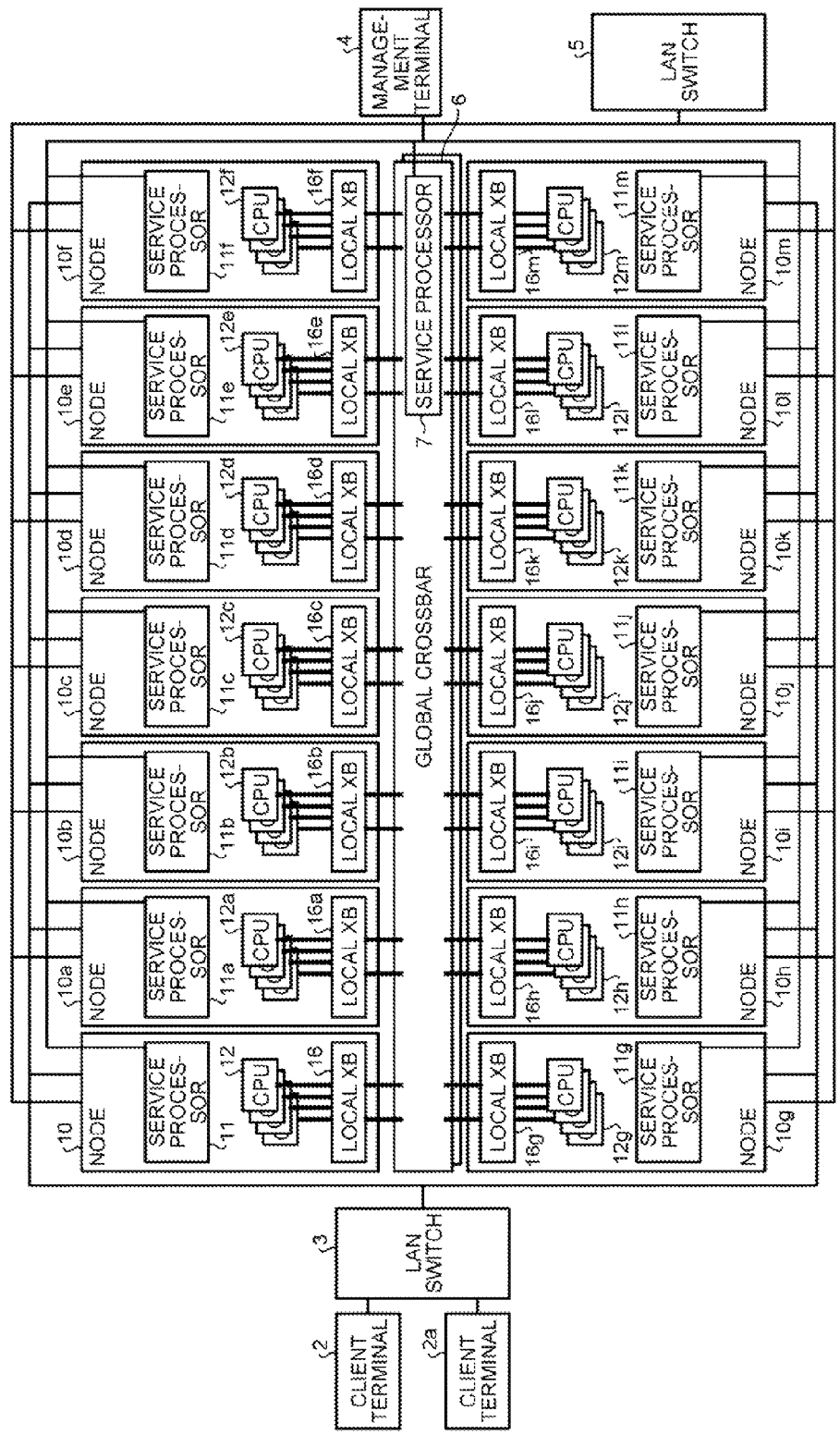
FIG. 1 is a schematic diagram illustrating an information processing system according to a first embodiment.

In a first embodiment described below, an example of an information processing system will be described with reference to FIG. 1. FIG. 1 is a schematic diagram illustrating an information processing system according to a first embodiment. In the example illustrated in FIG. 1, an information processing system 1 includes a client terminal 2, a client terminal 2a, a local area network (LAN) switch 3, a management terminal 4, a LAN switch 5, a double global crossbar 6, and nodes 10 to 10m. The global crossbar 6 includes a service processor 7.

In the first embodiment, a node is a unit in which a single and independent operating system (OS) runs and includes the bare minimum needed device for running the OS. As will be described later, the node includes one or more CPUs, memories, and hard disk drives (HDDs) or external storage device instead of the HDDs. The node may also be a single physical device or may also be physically constituted from multiple devices that are connected by using, for example, a cable.

The nodes 10 to 10m are connected, via a service LAN, to the LAN switch 3 and the client terminals 2 and 2a. Furthermore, the nodes 10 to 10m are connected to the LAN switch 5 via an internal LAN. Furthermore, the nodes 10 to 10m are connected to the management terminal 4 via a management LAN. Furthermore, the nodes 10 to 10m are connected to the double global crossbar 6 and are connected with each other via an interconnection.

Each of the client terminals 2 and 2a obtains a service from each of the nodes 10 to 10m via the service LAN. Although not illustrated in FIG. 1, the information processing system 1 may also include an arbitrary number of additional client terminals.

The node 10 includes a service processor 11, a CPU 12, and a local XB (crossbar) 16. Similarly to the node 10, other nodes 10a to 10m include service processors 11a to 11m, CPUs 12a to 12m, and local XBs 16a to 16m, respectively.

Each of the service processors 11 to 11m is connected to the management terminal 4 via the management LAN and executes management control, such as the management of a power supply in each of the nodes 10 to 10m. The service processor 7 included in the global crossbar 6 operates as the master of the service processors 11 to 11m and performs overall management control. Examples of the management control executed by each of the service processors 7, and 11 to 11m include power supply management, resets, changes in operation modes, setting of the addition or the deletion of nodes, collection of error logs, and operation control of degeneracy.

Furthermore, the nodes 10 to 10m independently execute the operating system (OS). Although not illustrated in FIG. 1, each of the nodes 10 to 10m includes multiple CPUs other than the CPUs 12 to 12m, respectively. The CPUs in the nodes 10 to 10m are connected to the global crossbar 6 via the local XBs 16 to 16m, respectively.

The CPUs in the nodes 10 to 10m output a memory access request, which is a request for memory access, to the respective local XBs 16 to 16m, thereby the CPUs transfer the memory access request to other nodes. Then, when the CPUs in the nodes 10 to 10m obtain a memory access request, the CPUs execute memory access in a similar manner as that executed when a CPU accesses the memory connected to the own CPU.

In the following, the functional configuration of the nodes 10 to 10m will be described with reference to FIG. 2. In the description below, the functional configuration of the node 10 will be described. Each of the nodes 10a to 10m executes the same process as that executed by the node 10; therefore, a description thereof will be omitted.

Figure 2:
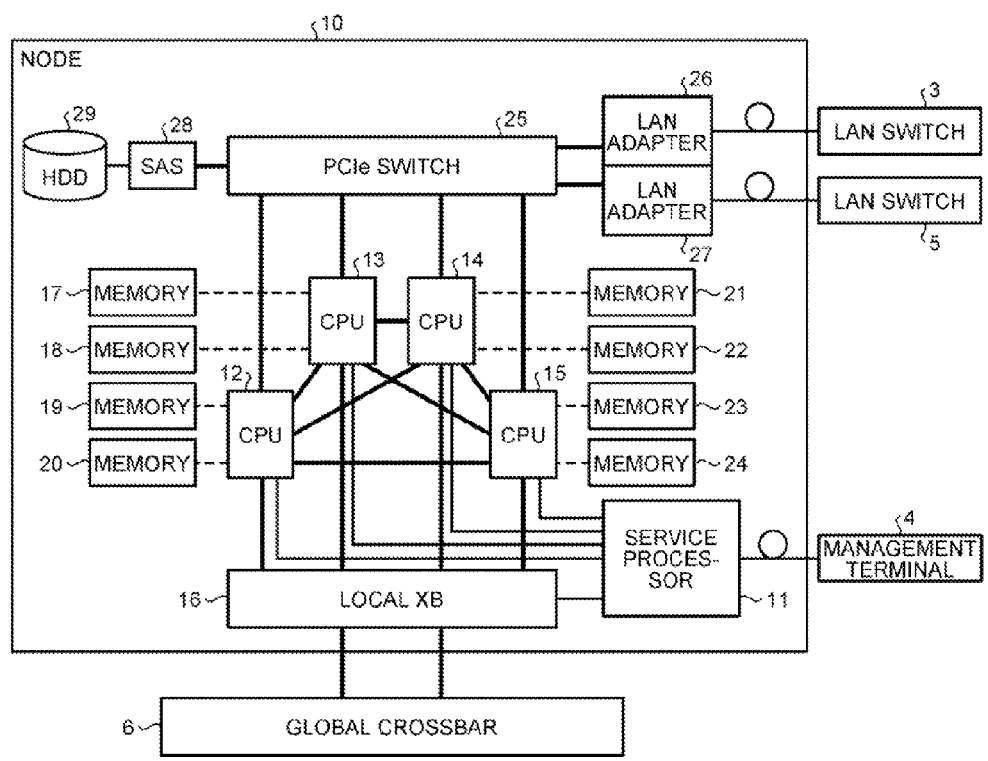
FIG. 2 is a schematic diagram illustrating the functional configuration of a node according to the first embodiment.

FIG. 2 is a schematic diagram illustrating the functional configuration of a node according to the first embodiment. In the example illustrated in FIG. 2, the node 10 includes the service processor 11, CPUs 12 to 15, the local XB 16, memories 17 to 24, and a Peripheral Component Interconnect Express (PCIe) switch 25. Furthermore, the node 10 includes a LAN adapter 26 to connect to the service LAN, a LAN adapter 27 to connect to the management LAN, a Serial Attached SCSI (SAS) 28, and a hard disk drive (HDD) 29.

The memory 17 and the memory 18 are connected to the CPU 13 and are storage devices that receive memory access performed by the CPU 13. The memory 19 and the memory 20 are connected to the CPU 12 and are storage devices that receive memory access performed by the CPU 12. The memory 21 and the memory 22 are connected to the CPU 14 and are storage devices that receive memory access performed by the CPU 14.

The memory 23 and the memory 24 are connected to the CPU 15 and are storage devices that receive memory access performed by the CPU 15. In the example illustrated in FIG. 2, the node 10 includes the HDD 29; however, the embodiment is not limited thereto. For example, the HDD 29 may also be arranged outside the node 10 by using a technology, such as Storage Area Network (SAN) technology.

The service processor 11 performs management control of the node 10. Specifically, the service processor 11 includes a processor and a Field-Programmable Gate Array (FPGA) that performs a process and receives, from the management terminal 4 via the management LAN, an instruction to perform management control. Then, the service processor 11 performs various management controls in accordance with the instruction received from the management terminal 4.

The PCIe switch 25 is a switch that controls access to, for example, an I/O device connected to each of the CPUs 12 to 15 via PCIe slots. The LAN adapter 26 is a LAN adapter that connects the service LAN to the node 10. The LAN adapter 27 is a LAN adapter that connects the management LAN to the node 10. The SAS 28 is an adapter for the LAN or the SAS mounted to the PCIe slot and relays the connection between the HDD 29 and each of the CPUs 12 to 15.

In the following, the CPUs 12 to 15 will be described. In the following description, the CPU 12 will be described. The CPUs 13 to 15 have the same function as that performed by the CPU 12; therefore, a description thereof will be omitted.

The CPU 12 and the other CPUs 13 to 15 are all connected to each other. Furthermore, the CPU 12 includes a cache memory that caches data stored by the memory 19 or the memory 20 and performs arithmetic processing by using the cached data. Furthermore, the CPU 12 has a function of a memory interface that performs memory access to each of the memory 19 and the memory 20. Furthermore, the CPU 12 has a PCIe interface function that controls access by using the HDD 29, the internal LAN, or the management LAN via the PCIe switch 25.

Furthermore, the CPU 12 is connected, by an interconnection, to the CPUs included in the other nodes 10a to 10m via the local XB 16 and the global crossbar 6 and has a function of an interconnect router that transmits and receives memory access requests between each CPU. The CPU 12 having such a configuration performs the following process when, for example, a memory access request is issued to the memory 19 or the memory 20 by a process to be executed. Specifically, the CPU 12 accesses the memory 19 or the memory 20 and caches the data to be accessed.

Furthermore, when a memory access request is issued to a memory other than the memory 19 and the memory 20 by a process to be executed, the CPU 12 identifies the CPU connected to a memory that is the target of the memory access and transmits the memory access request to the identified CPU.

Specifically, the CPU 12 has a node map in which a memory address to be accessed is associated with information uniquely indicating the CPU that accesses a storage area indicated by the memory address.

Then, if a process issues a memory access request, the CPU 12 refers to the node map and identifies a CPU that is associated with the memory address that is the target of the memory access. Thereafter, the CPU 12 creates a packet whose destination is the identified CPU, stores the memory access request in the created packet, and outputs the packet to the CPUs 12 to 15 connected with each other or to the local XB 16. If the packet is output to the local XB 16, the local XB 16 transmits, via the global crossbar 6, the packet to a CPU corresponding to the destination of the packet.

At this point, the CPU 12 executes the following process in addition to the above process. First, the CPU 12 previously sets a value called a memory token in the storage area, which is shared with the other node, between the storage areas in the memory 19 and the memory 20. Then, the CPU 12 notifies the CPU that issues a memory access request to the memory 19 or the memory 20 of a storage area to which access is permitted and notifies the CPU of a memory token associated with the notified storage area as an access token.

Furthermore, the CPU 12 previously obtains an access token from a node to which the CPU 12 transmits a memory access request and retains the obtained access token. Then, if the CPU 12 issues a memory access request, the CPU 12 stores the retained access token in a packet together with the memory access request and transmits the packet.

Furthermore, if the CPU 12 receives a memory access request from a CPU in the other node, the CPU 12 determines whether the access token received together with the memory access request matches the memory token that is associated with the storage area to be accessed. If the access token matches the memory token, the CPU 12 executes the memory access, whereas, if the access token does not match the memory token, the CPU 12 rejects the execution of the memory access.

If the CPU 12 performs memory access on the memory 19 or the memory 20, the CPU 12 performs a process for retaining the coherency of the data cached by the memory 19 or the memory 20. For example, the CPU 12 transmits a snoop to the CPU that has cached the data from the memory 19 or the memory 20 and performs a write back of the cached data.

The local XB 16 is a switch that transfers, to the specified destination, a packet that is exchanged between the CPUs 12 to 15 included in the node 10 and the CPUs included in the other nodes 10a to 10m. For example, the local XB 16 transmits the packet, which is issued by the CPU 12 and is to be transmitted to the CPU 12a, to the CPU 12a included in the node 10a via the global crossbar 6.

The memory 17 to the memory 24 are memories that store therein data used by each of the OSs or the applications and are, for example, Dual In-Line Memory Modules (DIMMs). Furthermore, the memories 17 to 24 map the same memory address space.

Furthermore, the memories 17 to 24 each have an area that can be accessed by only the CPUs 12 to 15 in the same node, i.e., a local area that is an area dedicated to the node that includes the CPUs 12 to 15. Furthermore, the memories 17 to 24 each have an area that can be accessed by an arbitrary CPU included in the information processing system 1, i.e., have a shared memory area that can be used by all of the nodes. Furthermore, the shared memory area for the memories 17 to 24 is divided into multiple segments. Each segment is a protected area in which access control is performed by a memory token or is a non-protected area in which access control is not performed by a memory token.

Figure 3:
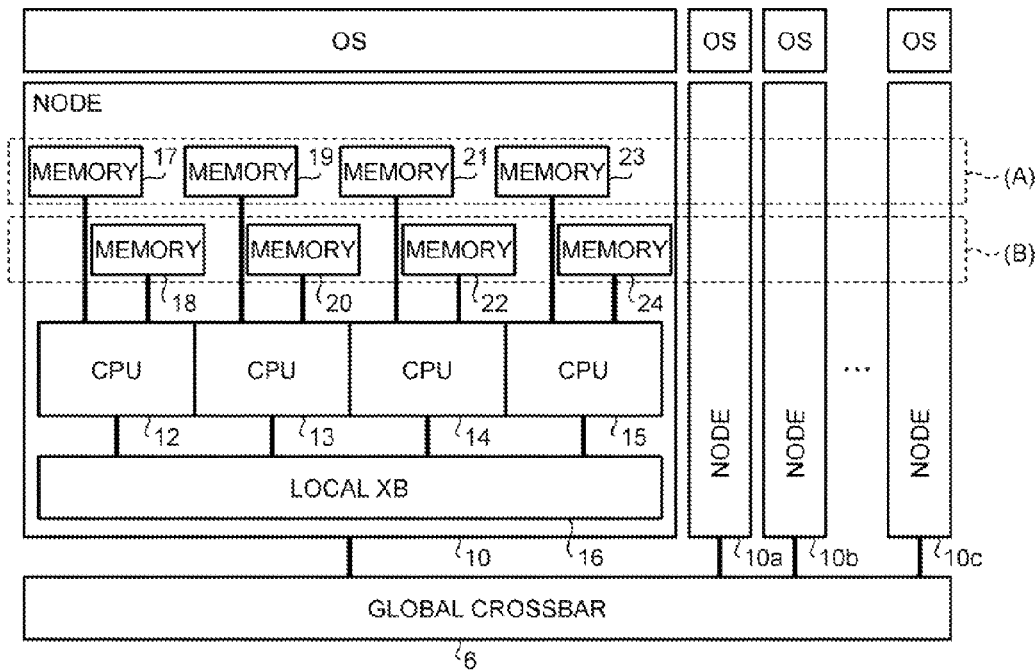
FIG. 3 is a schematic diagram illustrating an allocation of memories according to the first embodiment.

In the following, memory addresses that are mapped in the memories 17 to 24 will be described with reference to FIGS. 3 and 4. FIG. 3 is a schematic diagram illustrating an allocation of memories according to the first embodiment. For example, between the two memories included in each CPU, the information processing system 1 uses one memory as a memory only for a local area and uses the other memory as a memory only for a shared memory area. Specifically, as illustrated in (A) of FIG. 3, the memory 17, the memory 19, the memory 21, and the memory 23 are used as memories dedicated to the nodes and, as illustrated in (B) of FIG. 3, the memory 18, the memory 20, the memory 22, and the memory 24 are used as a shared memory.

Figure 4:
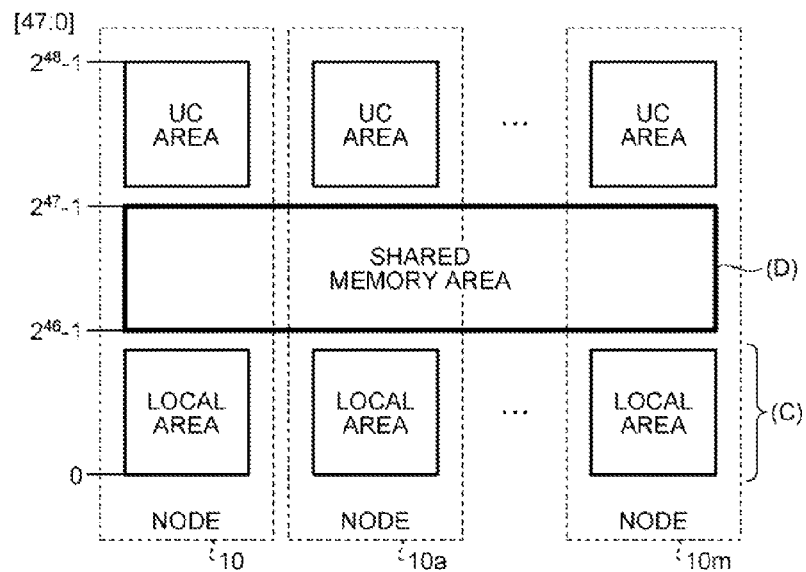
FIG. 4 is a schematic diagram illustrating a memory map in which the information processing system according to the first embodiment maps each memory.

FIG. 4 is a schematic diagram illustrating a memory map which the information processing system according to the first embodiment maps onto each memory. FIG. 4 illustrates an example in which a total of the 128-terabyte memory address space is prepared, with 64 terabytes out of 128 terabytes being allocated to the local area and 64 terabytes out of 128 terabytes being allocated to the shared memory area.

For example, the information processing system 1 allocates memory addresses of "0" to "$2^{46}-1$" in the area used as the local area in the memories included in the nodes 10 to 10m. Furthermore, the information processing system 1 allocates memory addresses of "$2^{46}$" to "$2^{47}-1$" in the area used as the shared memory area in the memories included in the nodes 10 to 10m.

Specifically, in the example illustrated in FIGS. 3 and 4, the information processing system 1 maps the memory addresses in the area illustrated in (C) of FIG. 4 onto the memory 17, the memory 19, the memory 21, and the memory 23 illustrated in (A) of FIG. 3. Furthermore, the information processing system 1 maps the memory addresses in the region illustrate in (D) of FIG. 4 onto the memory 18, the memory 20, the memory 22, and the memory 24 illustrated in (B) of FIG. 3. The addresses of "$2^{47}$" to "$2^{48}-1$" illustrated in FIG. 4 are the address ranges used as an uncacheable (UC) area and are the address ranges for I/O space used by, for example, an I/O device, such as the HDD 29.

As described above, the information processing system 1 maps a single piece of memory address space onto memories included in the nodes 10 to 10m. Accordingly, an arbitrary CPU can directly access the shared memory area in an arbitrary node. The memory map illustrated in FIG. 4 is only an example; therefore, arbitrary allocation may also be performed.

Specifically, there is no need to allocate all of the memory addresses on the memory map to the memories. For example, a memory hole may also be presented. Furthermore, the memory map may also be set such that the local area used by the OS is present in each node included in the information processing system 1 and the shared memory area is present in one or more nodes.

If the information processing system 1 maps continuous memory addresses onto the memories (for example, the memory 17 and the memory 18) included in a single node, the information processing system 1 can delete the control resources. Furthermore, the information processing system 1 allocates memory addresses such that segment regions are at least aligned.

Figure 5:
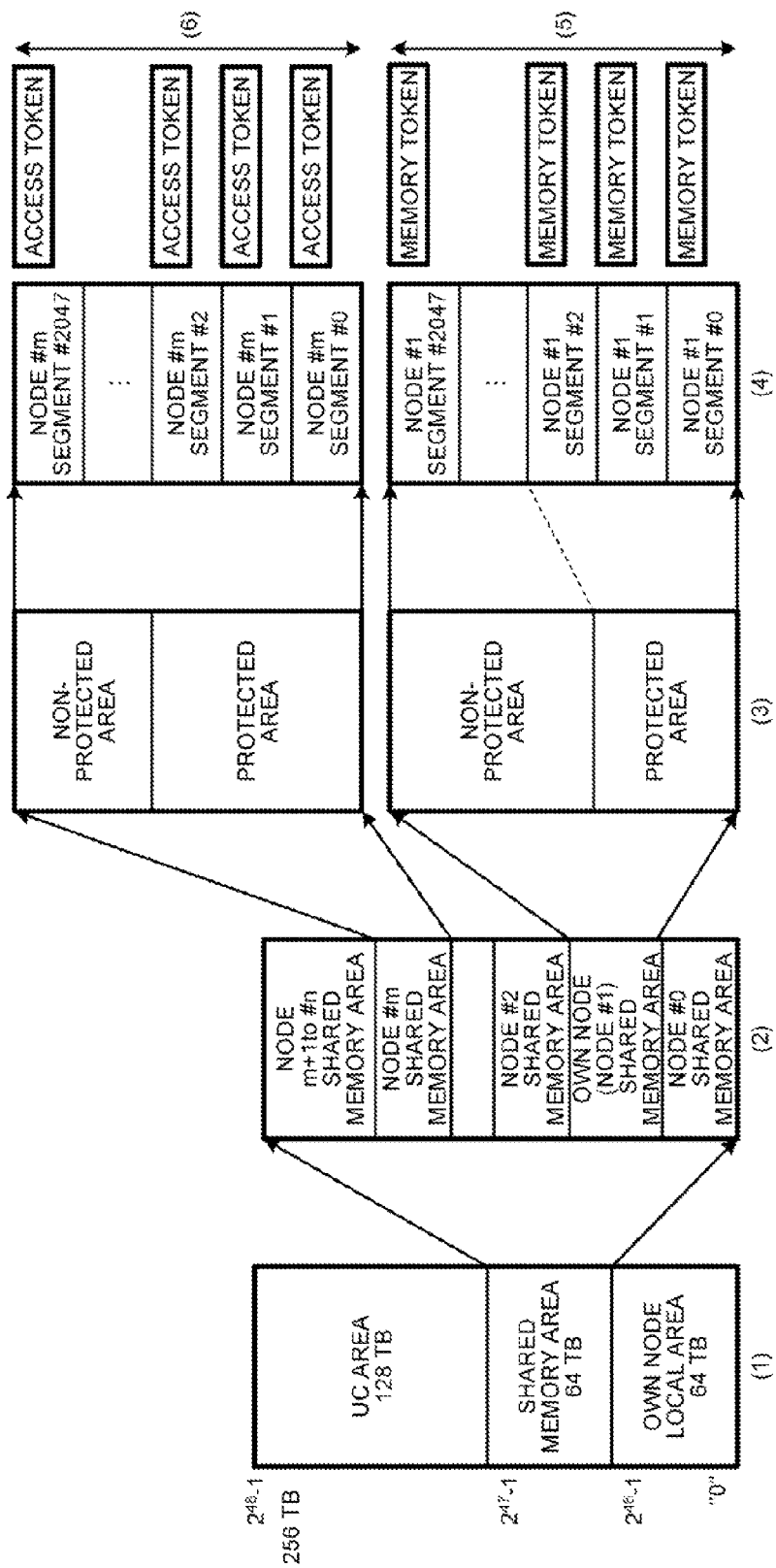
FIG. 5 is a schematic diagram illustrating shared memory areas allocated by the information processing system according to the first embodiment.

In the following, shared memory areas allocated to the memories in each node will be described with reference to FIG. 5. FIG. 5 is a schematic diagram illustrating shared memory areas allocated by the information processing system according to the first embodiment. In the example illustrated in FIG. 5, a description will be given of a case in which the information processing system 1 includes nodes #0 to #n and distributes shared memory areas to the nodes #0 to #n.

For example, as illustrated in (1) of FIG. 5, the information processing system 1 allocates a 64-terabyte local area and a 64-terabyte shared memory area to each of the nodes #0 to #n. Specifically, as illustrated in (2) of FIG. 5, the information processing system 1 equally distributes the 64-terabyte shared memory area to each of the nodes #0 to #n.

At this point, each of the nodes #0 to #n divides the distributed shared memory area into a protected area and a non-protected area. The protected area mentioned here is an area that protects access by determining whether an access token matches a memory token when a memory access request is received from another node. The non-protected area mentioned here is an area in which another node can freely perform memory access.

For example, as illustrated in (3) of FIG. 5, for the shared memory area allocated to a node #1, the node #1 can use a maximum of 4 terabytes as a protected area or a non-protected area. Furthermore, as illustrated in (4) of FIG. 5, the node #1 divides the shared memory area into segments corresponding to segments #0 to #2047 with 2 gigabytes. Then, as illustrated in (5) of FIG. 5, the node #1 sets a memory token for each segment.

Furthermore, in the example illustrated in FIG. 5, the node #1 uses the segments #0 to #2 as the protected area and sets a memory token in each segment. The memory token is, for example, a 13-bit value. In the example illustrated in FIG. 5, the node #1 sets the segments #3 to #2047 as the non-protected area and sets "all0" as the memory token. Specifically, when each of the nodes #0 to #n accesses the corresponding non-protected area, the nodes can access the non-protected area by using the access token of "all0".

Furthermore, the node #m also divides its own shared memory area into the segments #0 to #2047 and sets a memory token in each of the segments #0 to #2047. As illustrated in (6) of FIG. 5, the memory token that is set in each of the segments #0 to #2047 by the node #m is used by the node #1 as an access token. Accordingly, when the node #1 accesses the shared memory area in the node #m, the node #1 obtains the memory token that is set by the node #m and uses the obtained memory token as the access token, thereby the node #1 accesses the shared memory area in the node #m.

Each of the nodes #0 to #n includes, in the local area, a shared memory segment management table used to manage each segment in each shared memory area. Furthermore, to prevent the same memory token from being set in multiple segments, each of the nodes #0 to #n includes, in the local area, a memory token management table used to manage memory tokens that have been set. In the following, the shared memory segment management table and the memory token management table will be described with reference to FIGS. 6 and 7.

First, an example of the shared memory segment management table will be described with reference to FIG. 6. FIG. 6 is a schematic diagram illustrating a shared memory segment management table according to the first embodiment. FIG. 6 illustrates the shared memory segment management table included in the node #2. As illustrated in FIG. 6, the shared memory segment management table stores therein a segment number, a use flag, an application ID, a use node flag, and a token.

The segment number is a number indicating each segment in the shared memory area. The use flag is a flag indicating whether each segment is used. The application ID is an ID uniquely indicating a process that uses each segment. The use node flag is a flag indicating a node that uses each segment. The token is a memory token that is set in each segment.

The example illustrated in FIG. 6 indicates that a segment #0 and a segment #1 in the node #2 are used by a process indicated by the application ID "100" from among the processes executed by the node #1 and indicates that the memory tokens are "3015" and "2156", respectively. Furthermore, the example indicates that the segment #2 in the node #2 is not used and the segment #3 is used by a process indicated by the application ID "150" from among the processes executed by the node #3 and indicates that the memory token is "all0", i.e., the segment #3, is the non-protected area.

Each of the nodes #0 to #n executes memory access received from the other nodes by using the shared memory segment management table illustrated in FIG. 6. For example, the node #2 obtains, together with the access token "3015" from the process indicated by the application ID "100" in the node #1, a memory access request with respect to the segment #0. In such a case, because the obtained access token matches the memory token stored in the shared memory segment management table, the node #2 executes memory access.

In contrast, if the node #2 obtains, together with the access token "3000" from the process indicated by the application ID "100" in the node #1, a memory access request with respect to the segment #0, the node #2 determines that the memory token does not match the access token. Accordingly, the node #2 does not execute the memory access request.

Furthermore, each of the nodes #0 to #n changes a memory token in one of the segments, each of the nodes #0 to #n refers to the shared memory segment management table and identifies a node that is using the segment associated with the memory token to be changed. Then, each of the nodes #0 to #n notifies the identified node of a new memory token.

The shared memory segment management table may also be set by a shared memory driver that is driver software that arbitrarily manages the shared memory. For example, the shared memory driver creates a shared memory segment management table when the information processing system 1 is booted or when it accesses the shared memory area for the first time.

In the following, the memory token management table will be described with reference to FIG. 7. FIG. 7 is a schematic diagram illustrating a memory token management table according to the first embodiment. In the example illustrated in FIG. 7, the memory token management table stores therein, in an associated manner, a value of a memory token, a use flag, and an application ID. FIG. 7 illustrates the memory token management table stored by the node #1.

For example, the example of the memory token management table illustrated in FIG. 7 indicates that the memory token "0" and the memory token "1" are distributed to the segments used by the processes indicated by the application ID "100". Furthermore, the memory token management table indicates that the memory token "2" is not distributed to the segments. Furthermore, the memory token management table indicates that the memory token "3" is distributed to the segment used by the process indicated by the application ID "150". Similarly to the shared memory segment management table, the shared memory driver may also arbitrarily create the memory token management table.

Figure 8:
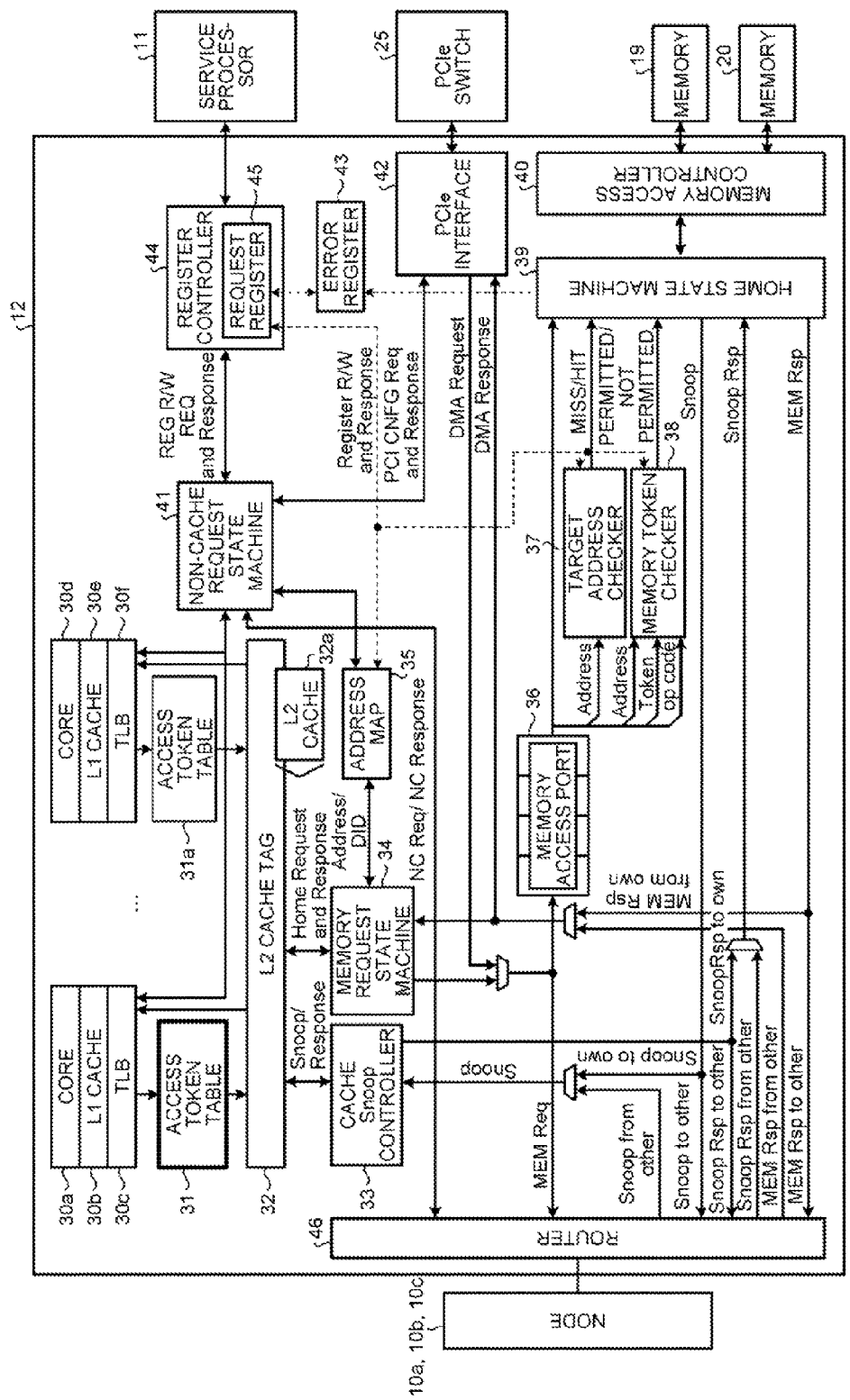
FIG. 8 is a schematic diagram illustrating an example of a CPU according to the first embodiment.

In the following, an example of the specific functional configuration of the CPU 12 will be described with reference to FIG. 8. FIG. 8 is a schematic diagram illustrating an example of a CPU according to the first embodiment. In the example illustrated in FIG. 8, it is assumed that the CPU 12 is a multicore processor including multiple cores and is a processor containing an Level 1 (L1) cache, an L2 cache, and a memory access controller (MAC).

As illustrated in FIG. 8, the CPU 12 includes multiple cores 30a and 30d, L1 caches 30b and 30e, and multiple Translation Lookaside Buffers (TLBs) 30c and 30f. Furthermore, the CPU 12 includes access token tables 31 and 31a for the cores 30a and 30d, respectively. Furthermore, the CPU 12 includes an Level 2 (L2) cache tag 32, an L2 cache 32a, a cache snoop controller 33, a memory request state machine 34, an address map 35, a memory access port 36, and a target address checker 37.

Furthermore, the CPU 12 includes a memory token checker 38, a home state machine 39, a memory access controller 40, a non-cache request state machine 41, a PCIe interface 42, and an error register 43. Furthermore, the CPU 12 includes a register controller 44 and a router 46. The register controller 44 includes a request register 45. Cores other than the core 30a and core 30d are not illustrated in FIG. 8; however, the CPU 12 may include an arbitrary number of cores.

The cores 30a and 30d execute arithmetic processing by using data stored in the L1 caches 30b and 30e. The L1 caches 30b and 30e are storage devices that can be accessed at high speed and are cache memories that cache the data stored in the memories 19 and 20. The TLBs 30c and 30f convert a virtual address that is output by the cores 30a and 30d to a physical address.

The access token table 31 is a register that stores therein an access token used such that the process executed by the core 30a accesses the shared memory area. For example, an access token that is notified by another node using an application executed by the core 30a is set in the access token table 31.

If data to be accessed is not retained in the L1 cache 30b, the core 30a outputs both a physical address of the target access and an operation code that indicates a memory access request. Then, the access token table 31 outputs, to the L2 cache tag 32, both the set access token and the memory access request.

The access token table 31 is a register that performs a context switch when a process executed by the core 30a is changed. Accordingly, when the CPU 12 changes the process executed by the core 30a to another process, the CPU 12 easily changes the access token that is set in the access token table 31. Specifically, when the CPU 12 changes the process executed by the core 30a, the CPU 12 can quickly and easily change the access token by performing only a context switch without receiving again a notification of the access token table from the node to be accessed.

The L2 cache tag 32 is a tag for the L2 cache 32a and is a pipeline used to access the L2 cache 32a. Furthermore, the L2 cache tag 32 has a mechanism of performing a serializing process on a memory access request with respect to the same addresses issued by the cores 30a and 30d.

The cache snoop controller 33 controls the snoop of the L2 cache 32a. Specifically, the cache snoop controller 33 receives a snoop issued by the home state machine 39 or the other node. Then, by issuing a snoop to the L2 cache tag 32, the cache snoop controller 33 checks the state of the data that is to be cached by the L2 cache 32a. Thereafter, the cache snoop controller 33 transmits the snoop result of the L2 cache 32a to the home state machine 39, which is the issue source of the snoop, or to the other nodes.

The memory request state machine 34 performs the following process if data to be accessed is not stored in the L2 cache 32a, i.e., a cache miss occurs in the L2 cache 32a. Specifically, the memory request state machine 34 issues a memory access request to the home state machine 39 and manages a process until a response is obtained.

Furthermore, if the memory request state machine 34 obtains the memory access request targeting for the same memory address during the time period from when the memory access request is issued until a response is obtained, the memory request state machine 34 allows the subsequent memory access request to wait. Then, if a response to the previous memory access request is issued, the memory request state machine 34 issues a memory access request that was made to wait. Furthermore, the memory request state machine 34 includes multiple entries, attaches an 8-bit entry ID, which is an identifier for each entry, to a memory request, and issues the memory request.

Furthermore, by outputting a physical address corresponding to a target for the memory access request to the address map 35, the memory request state machine 34 obtains an identifier of a CPU that accesses a storage area indicated by the physical address. Then, the memory request state machine 34 issues a memory access request by using the identifier of the CPU as the destination ID (DID), i.e., the destination.

The address map 35 stores therein, in an associated manner, a physical address and an identifier of a CPU that accesses a storage area indicated by the physical address and converts the physical address to the identifier of the CPU. For example, when the address map 35 obtains a physical address from the memory request state machine 34, the address map 35 issues, as a DID to the memory request state machine 34, the identifier of the CPU that is stored and is associated with the obtained physical address.

The memory access port 36 is a port that receives a memory access request with respect to the memory 19 or the memory 20, i.e., that receives a memory access request with respect to a home node (its own node). For example, the memory access port 36 is a FIFO and temporarily retains a memory access request with respect to a home node. If the home state machine 39 becomes the state in which it can execute a memory access request, the memory access port 36 issues the retained memory access request to the target address checker 37, the memory token checker 38, and the home state machine 39.

The target address checker 37 determines, from the memory access port 36, whether a memory address corresponding to the target access for the memory access request is the memory address of the memory in its own node, i.e., the memory address of the memory 19 or the memory 20. Then, the target address checker 37 notifies the home state machine 39 of the determination result.

The memory token checker 38 determines whether a memory token, which is set in a memory address corresponding to the target access for the memory access request, matches an access token, which is issued together with the memory access request. If the memory token matches the access token, the memory token checker 38 issues, to the home state machine 39, a signal indicating that access is permitted. Furthermore, if the memory token does not match the access token, the memory token checker 38 issues, to the home state machine 39, a signal indicating that access is not permitted.

The memory token checker 38 includes a memory token register that stores therein a memory token. The register controller 44 sets or updates the memory token.

The home state machine 39 executes memory access depending on whether an access token issued together with a memory access request matches a memory token. Specifically, the home state machine 39 obtains a memory access request from the memory access port 36. Furthermore, the home state machine 39 obtains, from the target address checker 37, a determination result indicating whether the target of the memory access request is its own node. Furthermore, the home state machine 39 obtains, from the memory token checker 38, a signal indicating that access is permitted or a signal indicating that access is not permitted.

Then, if the home state machine 39 obtains a determination result indicating that the target of the memory access request is its own node and obtains a signal indicating that the access is permitted, the home state machine 39 executes the memory access. In contrast, if the home state machine 39 obtains a determination result indicating that the target of the memory access request is not its own node or obtains a signal indicating that the access is not permitted, the home state machine 39 executes an access exception handling without executing the memory access request. Furthermore, if the home state machine 39 obtains a signal indicating that the access is not permitted, the home state machine 39 stores, in the error register 43, token mismatch error indicating that the memory token does not match the access token.

Furthermore, if the home state machine 39 executes memory access, the home state machine 39 executes the following process. First, the home state machine 39 issues, to the memory access controller 40, a physical address targeted for the memory access request and obtains data targeted for the memory access request from the memory 19 or the memory 20. Then, the home state machine 39 determines the state of the cache of the obtained data by using directory information.

Then, the home state machine 39 issues a snoop or the like in accordance with the determination result and executes a process such that the obtained data matches the cached data. A conventional method for retaining the coherency is used for the process for matching the obtained data and the cached data. Then, the home state machine 39 executes memory access, such as a read or a write, and then transmits, to the issue source, a completion response with respect to the memory access.

The memory access controller 40 executes memory access with respect to the memory 19 and the memory 20. For example, the memory access controller 40 obtains, from the home state machine 39, an instruction to read a physical address and data. Then, the memory access controller 40 transmits the data stored in the storage area indicated by the physical address to the home state machine 39.

Furthermore, when the memory access controller 40 obtains, from the home state machine 39, a physical address, a write instruction, and data, the memory access controller 40 writes the obtained data into the storage area indicated by the physical address. The memory access controller 40 may also have a patrol function or a function for executing a process, such as a correct write.

The non-cache request state machine 41 receives, from the cores 30a and 30d included in the CPU 12 or a core included in one of the other CPUs, an instruction obtained from a memory address in a UC area and executes the setting of a process via a PCIe.

For example, if each of the cores 30a and 30d obtains a request for a read or a write with respect to an I/O device, such as the HDD 29, the non-cache request state machine 41 issues the obtained request to the PCIe interface 42. Then, if the non-cache request state machine 41 receives a response to the request from the PCIe interface 42, the non-cache request state machine 41 transmits the obtained response to the cores 30a and 30d.

Furthermore, the non-cache request state machine 41 obtains a request with respect to the register controller 44 from each of the cores 30a and 30d. In such a case, the non-cache request state machine 41 issues the obtained request to the register controller 44. Furthermore, if the non-cache request state machine 41 obtains a response to the request from the register controller 44, the non-cache request state machine 41 transmits the obtained response to the cores 30a and 30d.

Furthermore, if the non-cache request state machine 41 obtains a setting request for the address map from the service processor 11 via the register controller 44, the non-cache request state machine 41 has a function for setting the address map 35 in accordance with the obtained request.

The PCIe interface 42 is connected to the PCIe switch 25 and is the root complex for the PCIe. For example, when the PCIe interface 42 obtains a request with respect to the I/O device or the like from the non-cache request state machine 41, the PCIe interface 42 issues the obtained request to the I/O device or the like via the PCIe switch 25. Then, when the PCIe interface 42 obtains a response via the PCIe switch 25, the PCIe interface 42 transmits the obtained response to the non-cache request state machine 41.

Furthermore, the PCIe interface 42 has a function of direct memory access (DMA) and can issue a DMA request to an arbitrary CPU. Furthermore, when the PCIe interface 42 obtains a DMA request from the other nodes, the PCIe interface 42 executes the DMA request and then issues a DMA response to the request source.

The error register 43 is a register that retains error information that has occurred in the CPU 12. The register controller 44 is a controller that writes or reads the registers in the CPU 12. For example, the error register 43 has a function for converting a physical address to a register address.

Then, the register controller 44 obtains, from the non-cache request state machine 41 or the like, a read request or a write request with respect to the register specified by the physical address. Thereafter, the register controller 44 converts the specified physical address to the register address and executes the write or the read on the register specified by the register address.

Furthermore, the register controller 44 includes the request register 45 and obtains, from the service processor 11 via an Inter-Integrated Circuit (I2C) or a Joint Test Action Group (JTAG), a read request or a write request with respect to the request register 45. In such a case, the register controller 44 executes the obtained request and outputs a response to the service processor 11. For example, when the register controller 44 is instructed to change the memory token by a process executed by the core 30a or 30d via the non-cache request state machine 41, the register controller 44 updates a memory token register, which will be described later.

The router 46 is a router for an interconnection and transmits a packet to the destination CPU specified by the DID. Furthermore, when the router 46 transmits a packet, the router 46 attaches a cyclic redundancy check (CRC) value to protect the packet to be transmitted.

In the example illustrated in FIG. 8, a snoop is represented by "Snoop", a response is represented by "Response" or "Rsp", a physical address is represented by "Address", and a memory token or an access token is represented by "Token". Furthermore, in the example illustrated in FIG. 8, an operation code is represented by "op code". Furthermore, a memory access request issued by the memory request state machine 34, i.e., a request from its own node, is represented by "Home Request".

Furthermore, a memory access request is represented by "MEM Req" and a response to the memory access request is represented by "MEM Rsp". In particular, a response, which is received from a memory in its own node, to a memory access request is represented by "MEM Rsp from own", whereas a response received from a memory in the other node is represented by "MEM Rsp from other". Furthermore, a response to a memory access request from the other node is represented by "MEM Rsp to other".

Furthermore, a snoop from the other node is represented by "Snoop from other" and a snoop to be transmitted to the other node is represented by "Snoop to other". Furthermore, a snoop issued to the L2 cache memory in its own node is represented by "Snoop to own" and a response to the snoop issued to the L2 cache memory in its own node is represented by "Snoop Rsp to own". Furthermore, a response to the snoop that has been transmitted to the other node is represented by "snoop Rsp from other" and a response to the snoop to be transmitted to the other node is represented by "snoop Rsp to other".

Furthermore, a request and a response that are transmitted by the non-cache request state machine 41 is represented by "NC (No Coherence) Req/NC Response". A read request and a write request with respect to a register and a response that are transmitted and received by the register controller 44 are represented by "REG R/W REQ and Response". Furthermore, a read or a write of a register performed by the register controller 44 is represented by "Register R/W and Response". A request and a response via the PCIe interface 42 is represented by "PCI CNFG Req and Response". Furthermore, a DMA request is represented by "DMA Request" and a DMA response is represented by "DMA Response".

Figure 9:
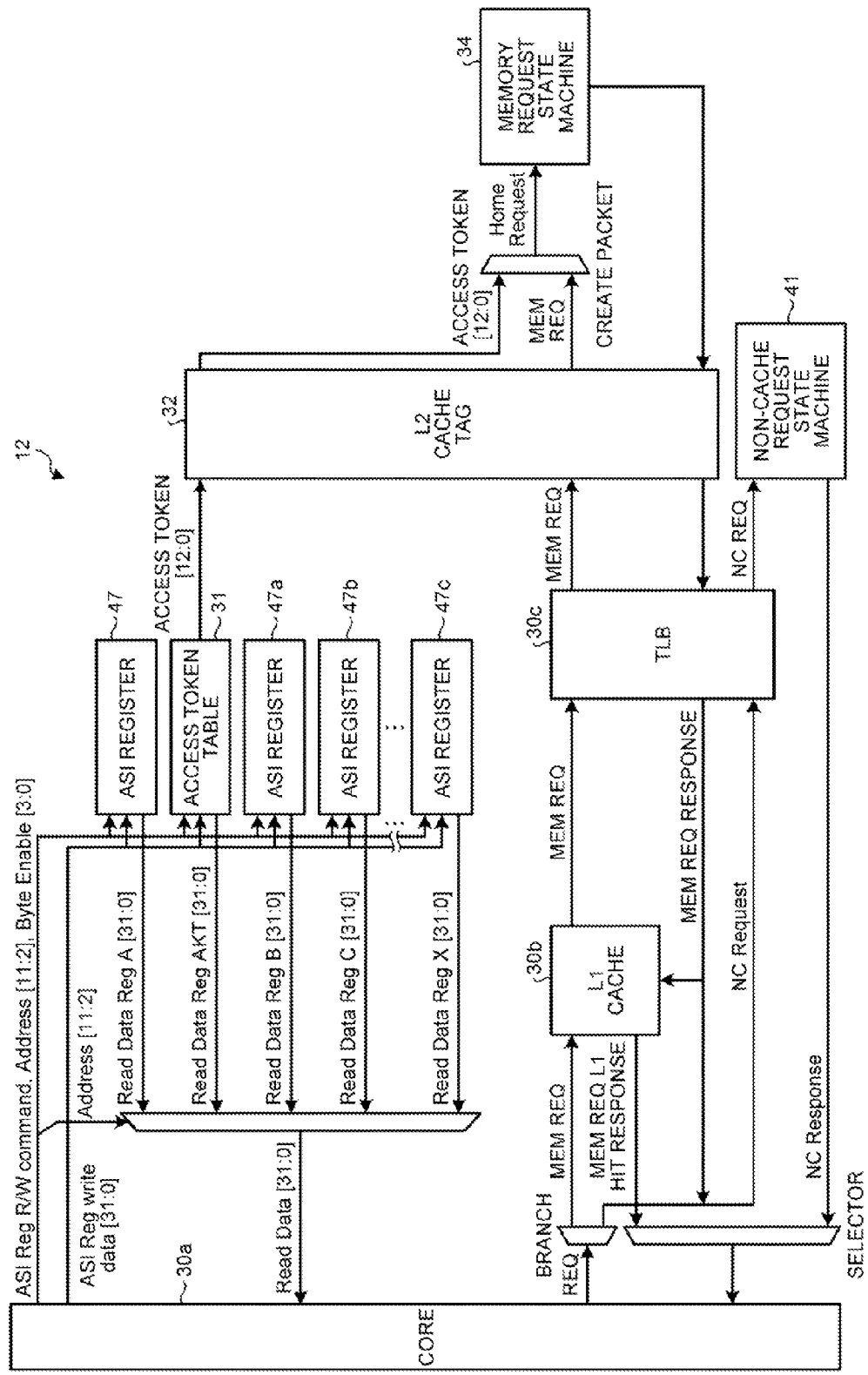
FIG. 9 is a schematic diagram illustrating the configuration of a register for an access token table according to the first embodiment.

In the following, the access token table 31 functioning as a register included in the CPU 12 will be described with reference to FIG. 9. FIG. 9 is a schematic diagram illustrating the configuration of a register for an access token table according to the first embodiment. As illustrated in FIG. 9, the CPU 12 includes multiple address space identifier (ASI) registers 47 to 47c into which data can be directly written from the core 30a. Furthermore, the CPU 12 uses one of the ASI registers as the access token table 31.

Figure 10:
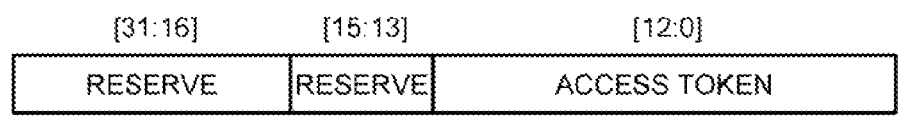
FIG. 10 is a schematic diagram illustrating register fields in the access token table.

FIG. 10 is a schematic diagram illustrating register fields in the access token table. In the example illustrated in FIG. 10, the access token table 31 has a 32-bit field containing "0" to "31" bits and uses bits from "31" to "13" as reserve fields. Furthermore, the access token table 31 uses bits from "12" to "0" as a field that contains access tokens.

At this point, the access token table 31 uses 13 bits corresponding bits from "12" to "0" as access tokens. Specifically, when the access token table 31 sets access tokens having the same number of segments as there are, the access token table 31 does not set an access token for access free. Accordingly, the access token table 31 sets access tokens, the number of which is greater than that of the segments.

A description will be given here by referring back to FIG. 9. The core 30a issues, to each of the ASI registers 47 to 47c and the access token table 31, an "ASI Reg R/W command", an "Address [11:2]", and a "Byte Enable [3:0]". The "ASI Reg R/W command" mentioned here is an instruction command to read or write each of the ASI registers 47 to 47c and the access token table 31.

The "Address [11:2]" mentioned here is a virtual address that is the target of the memory access request. Furthermore, the "Byte Enable [3:0]" mentioned here represents bits that indicates an enable state. When the core 30a instructs each of the ASI registers 47 to 47c and the access token table 31 to write, the core 30a simultaneously issues the "ASI Reg write data [31:0]".

When each of the ASI registers 47 to 47c obtains an instruction command to read, each of the ASI registers 47 to 47c issues the "Read Data Reg A [31:0]" to "Read Data Reg X [31:0]". Then, the access token table 31 outputs the "Read Data Reg AKT [0:31]". Thereafter, the core 30a obtains the "Read Data [31:0]" on the basis of the "Read Data Reg A [31:0]", the "Read Data Reg X [31:0]", and the "Read Data Reg AKT [0:31]".

At this point, when the access token table 31 obtains an instruction command to read, the access token table 31 outputs the access token [12:0]. When the L1 cache 30b receives the "MEM REQ", which is a memory access request, from the core 30a, the L1 cache 30b determines whether a cache hit occurs. If a cache hit occurs, the L1 cache 30b transmits the data, in which a cache hit has occurred, as the "MEM REQ L1 HIT Rsp" to the core 30a.

In contrast, if a cache miss has occurred, the L1 cache 30b transmits a memory access request to the TLB 30c. The TLB 30c converts a virtual address, which is the target of the memory access request, to a physical address and issues a memory access request to the L2 cache tag 32. The L2 cache tag 32 determines whether a cache hit occurs in the physical address corresponding to the target of the memory access request. If a cache hit has occurred, the L2 cache tag 32 transmits the data to the L1 cache 30b and the core 30a via the TLB 30c.

In contrast, if a cache miss has occurred, the L2 cache 32a transmits a memory access request to the memory request state machine 34. At this time, the access token [12:0] that is issued by the access token table 31 is attached to the memory access request. Then, the memory access request is transmitted to the memory request state machine 34 as the "Home Request". An "NC Request" issued by the core 30a is executed by the non-cache request state machine 41 via the TLB 30c and an "NC Response" is issued to the core 30a.

Figure 11:
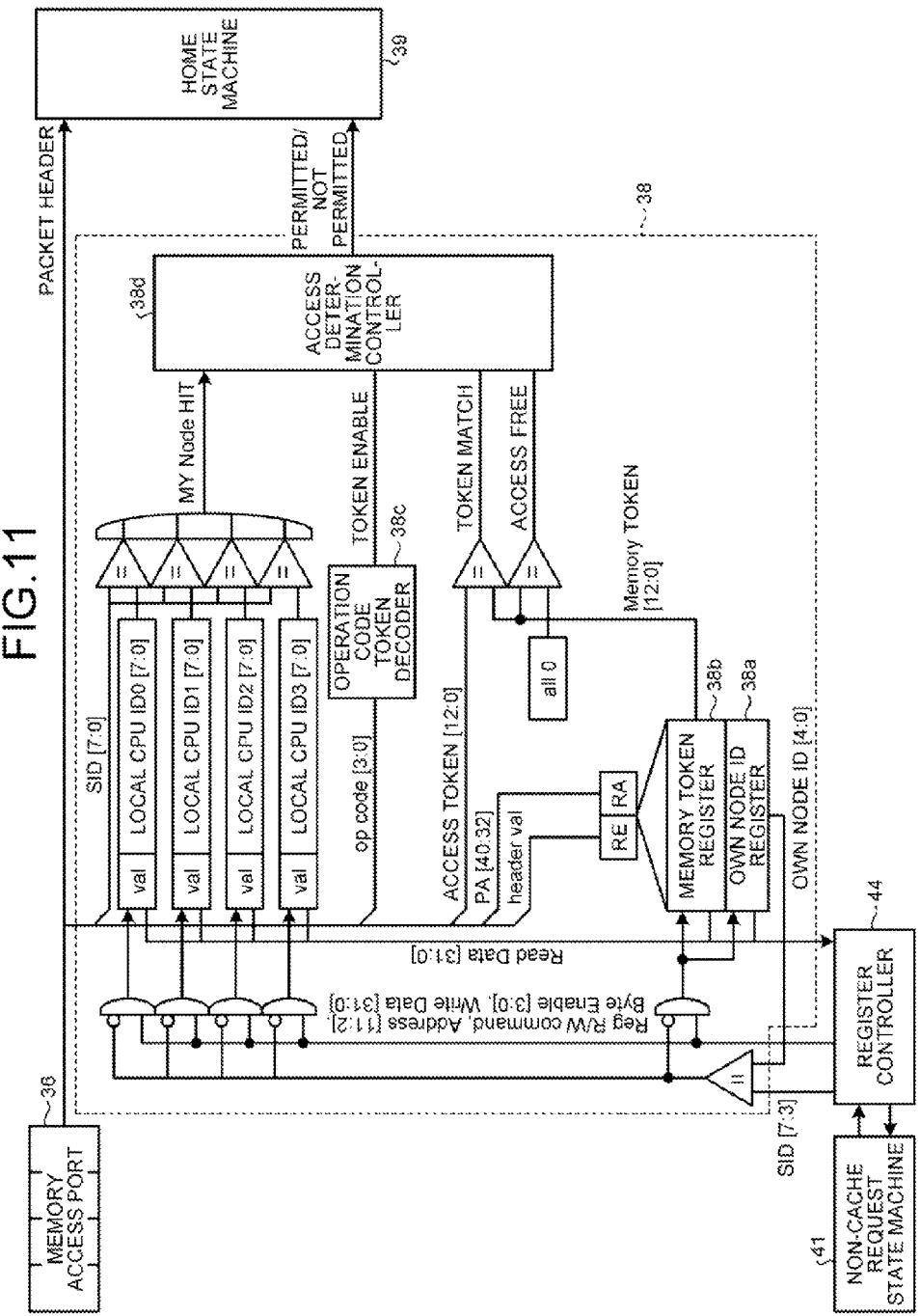
FIG. 11 is a schematic diagram illustrating an example of a memory token checker according to the first embodiment.

In the following, an example configuration of the memory token checker 38 will be described with reference to FIG. 11. FIG. 11 is a schematic diagram illustrating an example of a memory token checker according to the first embodiment. In the example illustrated in FIG. 11, the memory token checker 38 includes an own node ID register 38a, a memory token register 38b, an operation code token decoder 38c, and an access determination controller 38d. In the example illustrated in FIG. 11, a description will be given of a case in which a single node includes four CPUs. Furthermore, it is assumed that the memory token register 38b that has 512 entries and that has the same configuration as the access token register illustrated in FIG. 10.

For example, the memory token checker 38 obtains the "Reg R/W command", the "Address [11:2]", the "Byte Enable [3:0]", and the "Write Data [31:0]" from the register controller 44. The token checker 31 obtains the "Sender ID (SID) [7:3]" from the register controller 44. The "SID [7:3]" mentioned here is an identifier indicating a CPU that corresponds to the request source of the memory request.

Furthermore, the memory token checker 38 obtains a memory access request from the memory access port 36. FIG. 12 is a schematic diagram illustrating an example of a memory access request. As illustrated in FIG. 12, the packet of the memory access request contains a format, a destination ID, an operation code, a transmission source ID, an entry ID, a token, and a target address. The format contains 4-bit information indicating the type of the packet format.

The destination ID contains an ID indicating a destination CPU, i.e., an 8-bit DID. The operation code stores therein 4-bit information indicating the contents of the memory access request. The token stores therein a 16-bit access token. The target address contains a physical address that is the target of the memory access request. In addition to the packet illustrated in FIG. 12, data for writing the byte enable is transmitted to the memory access request that is a request for the writing of data.

Furthermore, for a memory access request that does not need an access token, e.g., for a flash back instruction and a write back instruction, a packet in which reserve is used as a token is transmitted. A snoop stores therein, instead of a token, an 8-bit CPU ID indicating a request source CPU and an 8-bit entry ID uniquely indicating a request source process.

Furthermore, a packet having a similar format to that in the packet illustrated in FIG. 12 is transmitted as a response to the memory access request. For example, instead of a token, 8-bit snoop response information is stored in a response to the snoop. Furthermore, a packet in which reserve is used as a token is transmitted as a completion response to the memory access request and the read data is attached to a response to a read request.

A description will be given here by referring back to FIG. 11. The memory token checker 38 obtains the SID [7:0] from the obtained memory access request and determines whether the obtained SID matches an own node ID corresponding to an ID of a CPU included in an own node. In the example illustrated in FIG. 11, the memory token checker 38 determines whether IDs of four CPUs, i.e., a CPU ID0 to a CPU ID3, matches the SID. Then, the memory token checker 38 inputs the determination results to the access determination controller 38d as the "MY Node HIT".

Furthermore, the memory token checker 38 obtains the operation code (op code [3:0]) from the memory access request and inputs the operation code to the operation code token decoder 38c. In such a case, the operation code token decoder 38c analyzes the obtained operation code and determines whether a process needs a match between the access token and the memory token. Then, the operation code token decoder 38c inputs the determination result as a token enable to the access determination controller 38d.

FIG. 13 is a schematic diagram illustrating an example of processes indicated by operation codes. FIG. 13 illustrates operation codes of memory access requests issued when the cache coherency using the MESI protocol (Illinois protocol) is executed.

For example, the memory access request containing the operation code "0000" is a request to execute a process called "READ IF". The "READ IF" is a process for acquiring a cache when an instruction area read from a core and a cache state are "Shared (S)". The memory access request containing the operation code "0001" is a request to execute a process called "READ OP". The "READ OP" is a process for acquiring a cache when data area read from a core and a cache state are "S" or "Exclusive (E)".

The memory access request containing the operation code "0010" is a request to execute a process called "READ EX". The "READ EX" is a process for acquiring, from a core, an exclusion-right acquisition read for storing data and for acquiring a cache when a cache state is "Shared (S)". The memory access request containing the operation code "0100" is a request to execute a process called "DMA Read". The "DMA Read" indicates a DMA read from an I/O and is a process that does not acquire a cache.

The memory access request containing the operation code "0110" is a request to execute a process called "DMA Write". The "DMA Write" indicates a DMA write from an I/O and is a process that does not acquire a cache. The memory access request containing the operation code "0111" is a request to execute a process called "DMA Write Partial". The "DMA Write Partial" is a process for partially executing a DMA write from an I/O and is a process that does not acquire a cache.

The memory access request containing the operation code "1000" is a request to execute a process called "Write Back". The "Write Back" is a process for writing data indicating that a cache state is "Modified (M)" when a CPU cache eviction is performed. The memory access request containing the operation code "1001" is a request to execute a process called "Flash Back".

The "Flash Back" is a process for changing the cache state of "E" or "S" to "I Invalid (I)" when a CPU cache eviction is performed. The memory access request containing the operation code "1010" is a request to execute a process called "Cache Flush". The "Cache Flush" is a request to execute a cache flush by a core.

In the example illustrated in FIG. 13, if the operation code is "0000", "0001", or "0010", the operation code token decoder 38c determines that the access token needs to match the memory token and outputs the token enable "1". If the operation code is other than "0000", "0001", and "0010", the operation code token decoder 38c determines that the access token does not need to match the memory token and outputs the token enable "0". The operation codes associated with processes illustrated in FIG. 13 are only examples; therefore, an arbitrary operation code may also be associated with an arbitrary process.

A description will be given here by referring back to FIG. 11. The memory token checker 38 searches the memory token register 38b for a memory token by using a segment address including a physical address to be accessed. Then, the memory token checker 38 inputs, to the access determination controller 38d, a "token match" indicating whether the searched memory token matches an access token of the memory access request.

In the example illustrated in FIG. 11, consecutive memory addresses are allocated to a segment in a single node. If non-consecutive memory addresses are allocated, a circuit that changes an entry number of an address token is arranged at the previous stage. In the example illustrated in FIG. 11, if the address token is "0000", this indicates the memory access request with respect to the non-protected area. Accordingly, the memory token checker 38 inputs a signal indicating "access free" to the access determination controller 38d.

The access determination controller 38d notifies the home state machine 39 indicating whether the execution of a memory access request is permitted in accordance with the input "MY Node HIT", "token enable", "token match", and "access free". FIG. 14 is a schematic diagram illustrating an example of a determination performed by an access determination controller.

For example, if the "MY Node HIT" is "No (0)", the token enable is "Yes (1)", the token match is "No (0)", and the access free is "No (0)", the access determination controller 38d does not permit to execute the memory access request. In a case other than these, the access determination controller 38d permits to execute the memory access request. Specifically, for a process for retaining the cache coherence, such as a write back, the access determination controller 38d permits to execute the memory access request regardless of the value of the token match.

A description will be given here by referring back to FIG. 11. In accordance with the notifications received from the access determination controller 38d and the target address checker 37, the home state machine 39 executes a memory access request obtained from the memory access port 36. FIG. 15 is a schematic diagram illustrating the contents of processes executed by a home state machine. For example, if the home state machine 39 is notified by the access determination controller 38*d* indicating that the execution of the memory access request is not permitted, the home state machine 39 executes an access exception process that is performed when the access token does not match the memory token.

Furthermore, if the home state machine 39 is notified, by the access determination controller 38*d*, indicating that the execution of the memory access request is permitted and notified, by the target address checker 37, indicating that a memory is not in the own node (MISS), the home state machine 39 executes the following process. Namely, the home state machine 39 executes an access exception operation that is performed when target addresses do not match.

Furthermore, if the home state machine 39 is notified, by the access determination controller 38*d*, indicating that the execution of the memory access request is permitted and is notified, by the target address checker 37, indicating that a memory is in the own node (HIT), the home state machine 39 executes the memory access request. If the memory access request issued by own node is not permitted, each of the CPUs 12 to 15 and 12*a* to 12*m* may also execute a retry by transmitting the same memory access request.

Figure 16:
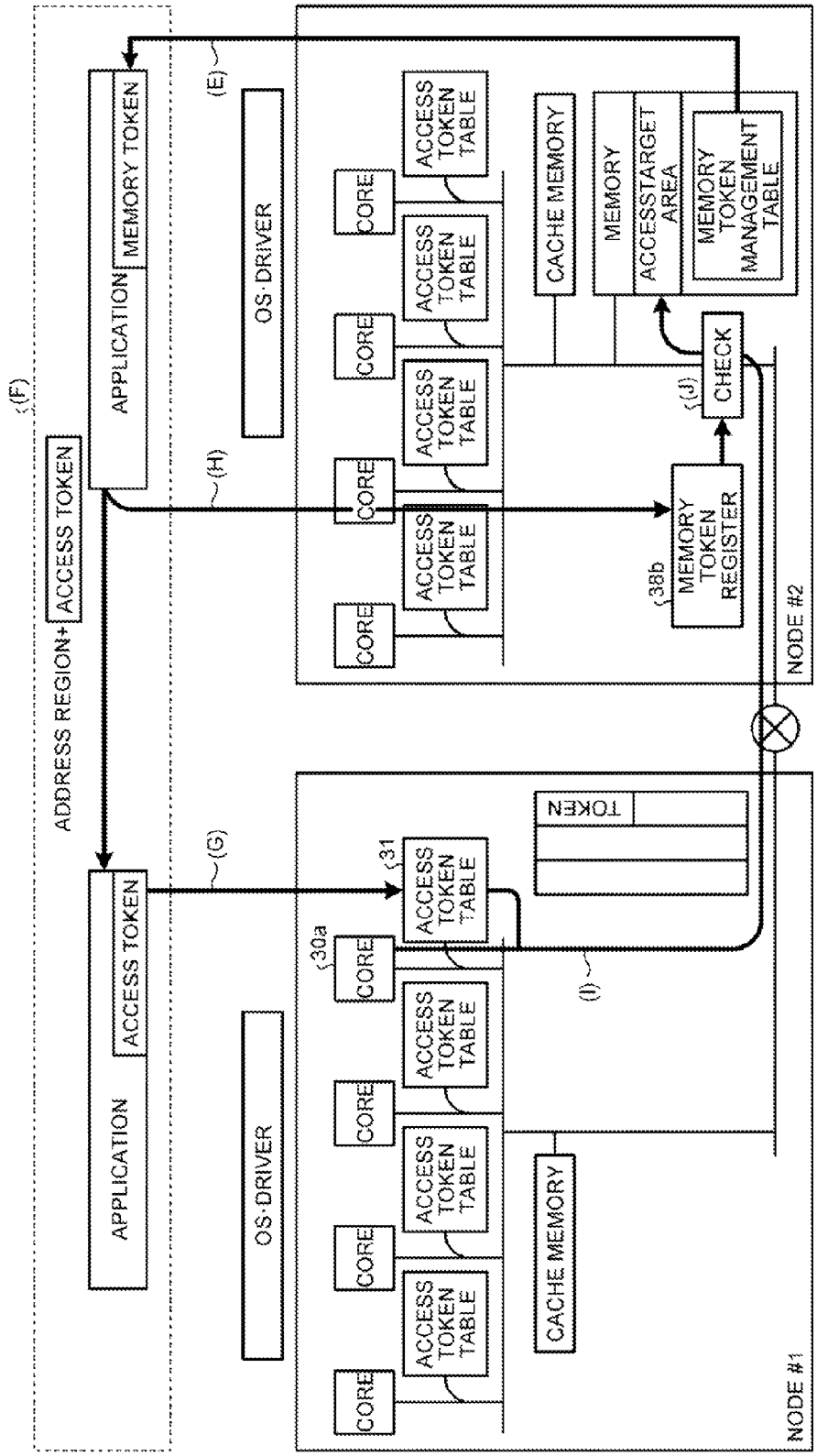
FIG. 16 is a schematic diagram illustrating the flow of memory access between nodes.

In the following, the flow of a process for executing memory access between nodes performed by the information processing system 1 will be describe with reference to FIG. 16. FIG. 16 is a schematic diagram illustrating the flow of memory access between nodes. FIG. 16 illustrates an example in which the node #1 performs memory access on the memory in the node #2.

For example, as illustrated in (E) of FIG. 16, by using the memory token management table, the application executed by the node #2 selects a memory token that has not been used. Then, as illustrated in (F) of FIG. 16, the application executed by the node #2 notifies the application executed by the node #1 of an address region to be accessed and an access token corresponding to the memory token.

In such a case, as illustrated in (G) of FIG. 16, the application executed by the node #1 sets the access token in the access token table 31. As illustrated in (H) of FIG. 16, the application executed by the node #2 sets, in the memory token register 38*b*, the memory token corresponding to the access token notified to the node #1.

At this point, as illustrated in (I) of FIG. 16, when the core 30*a* issues a memory access request, the node #1 attaches an access token that is set in the access token table 31 to the memory access request and transmits the memory access request to the node #2 by using an interconnection. Then, as illustrated in (J) of FIG. 16, the node #2 determines whether the access token attached to the memory access request matches the memory token that is set in the memory token register 38*b*.

Then, if the access token matches the memory token, the node #2 executes the memory access request with respect to the area to be accessed, whereas, if the access token does not match the memory token, the node #2 does not execute the memory access request.

As described above, each of the nodes in the information processing system 1 notifies a node that accesses a memory in a subject node of an access token and stores the notified access token in a memory token register as a memory token. If each of the nodes accesses a memory included in another node, each of the nodes attaches an access token, which is notified by a node to be accessed, to a memory access request and transmits the memory access request. Then, each of the nodes determines whether the access token attached to the memory access request matches the memory token. If each of the nodes determines that the access token matches the memory token, each of the nodes executes memory access.

Accordingly, even if one of the nodes fails and even if communication is not performed with another node, the information processing system 1 can stop the memory access performed from the failed node by a node to be accessed changing a memory token. Consequently, the information processing system 1 correctly performs a failover.

Figure 17:
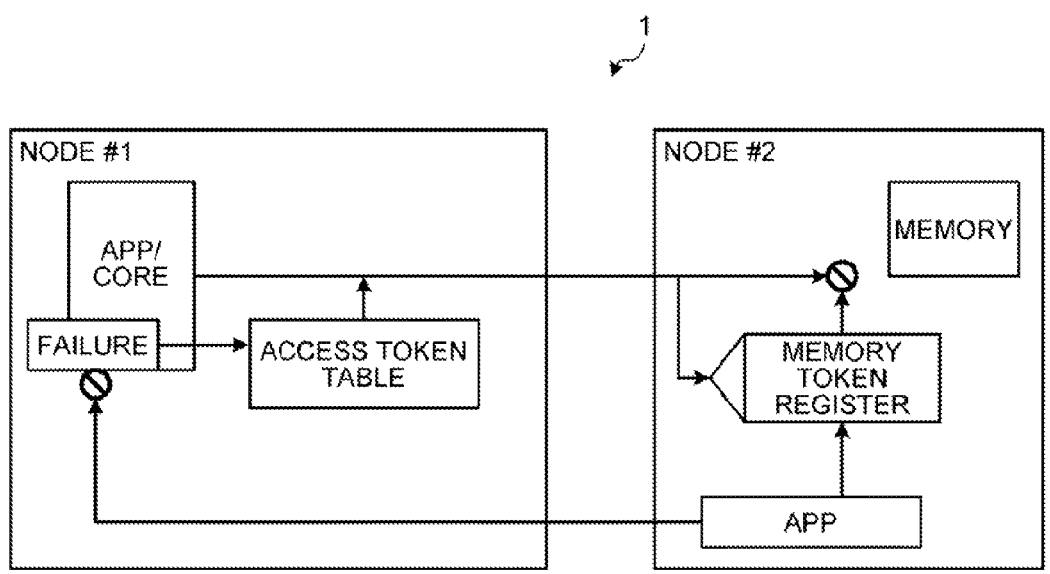
FIG. 17 is a schematic diagram illustrating a process for stopping memory access performed from a failed node.

In the following, a description will be given of a process for stopping memory access performed from a failed node because a node to be accessed changes a memory token. FIG. 17 is a schematic diagram illustrating a process for stopping memory access performed from a failed node. FIG. 17 illustrates an example in which the node #1 accesses the memory in the node #2. For example, the node #1 stores, in the access token table, the access token notified by the application included in the node #2 and transmits, to the node #2, a memory access request by attaching the access token.

At this point, if a failure occurs in the application executed by the node #1 and communication is not performed with node #2, the application in the node #2 does not change the access token stored in the node #1. However, the application executed by the node #2 can change the memory token stored in the node #2. Accordingly, the application executed by the node #2 changes the memory token that is stored in the memory token register in the node #2. Because the access token transmitted by the failed node #1 does not match the memory token stored in the node #2, the node #2 can prevent the node #1 from performing the memory access.

At this point, the node #2 can change the memory token at an arbitrary timing. Specifically, the node #2 changes the memory token and transmits the changed memory token as an access token to the node #1. Then, when the node #1 can communicate with the node #2, the node #1 correctly changes the access token and thus can continue accessing the node #2.

In contrast, if a failure has occurred in the node #1 and thus the node #1 does not communicate with the node #2, because the node #1 does not change the access token, the node #1 does not access the node #2. Consequently, when the information processing system 1 shifts the process executed by the node #1 to another node, the information processing system 1 can prevents the occurrence of the split brain state. Accordingly, the information processing system 1 correctly executes a failover.

Figure 18:
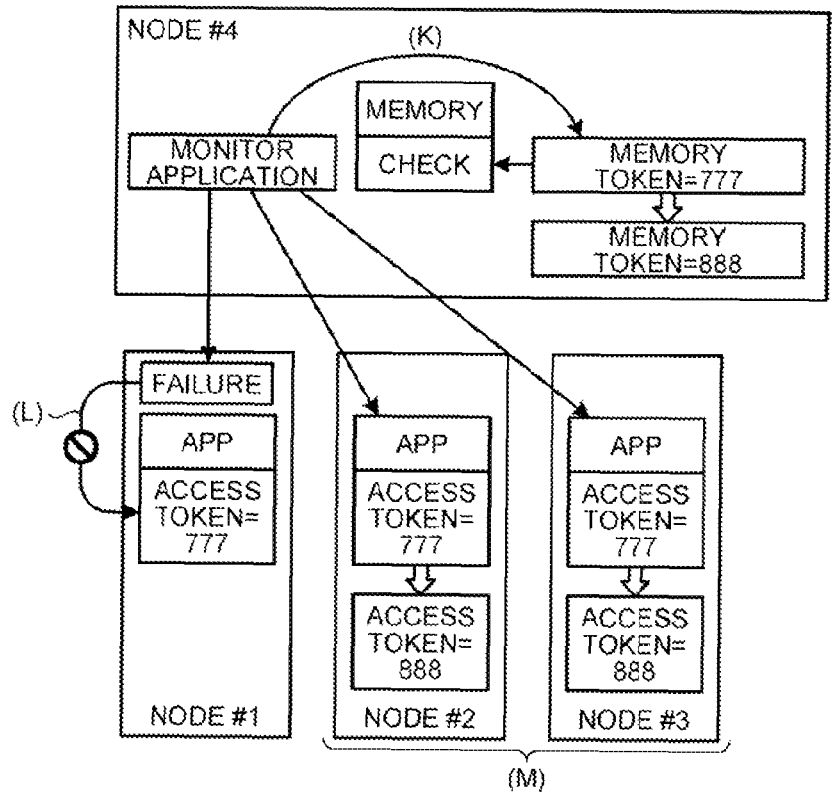
FIG. 18 is a first schematic diagram illustrating a process for preventing memory access from a node in which a failure has occurred.
Figure 19:
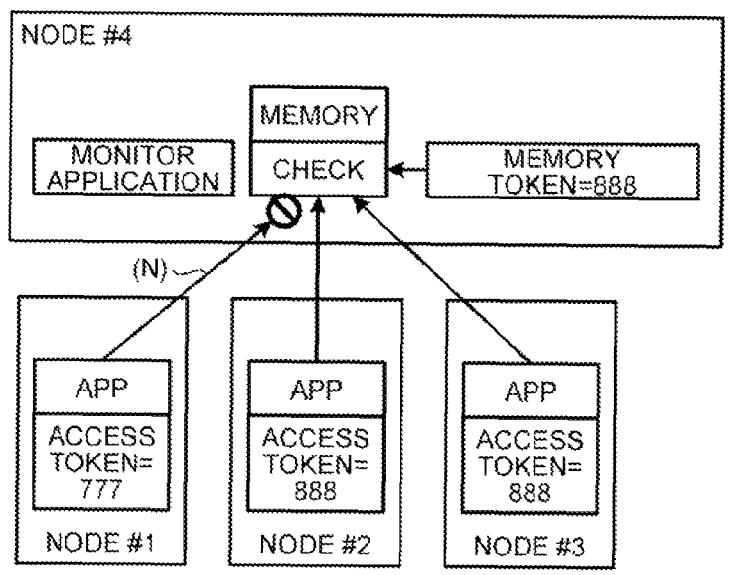
FIG. 19 is a second schematic diagram illustrating a process for preventing memory access from a node in which a failure has occurred.

In the following, a process for disconnecting a node in which a failure has occurred will be described with reference to FIGS. 18 and 19. FIG. 18 is a first schematic diagram illustrating a process for preventing memory access from a node in which a failure has occurred. FIG. 19 is a second schematic diagram illustrating a process for preventing memory access from a node in which a failure has occurred. FIGS. 18 and 19 each illustrate an example in which, when each of the nodes #1 to #3 issues a memory access request to the node #4, the application in the node #1 has failed and thus the application in the node #1 does not communicate with the other nodes #2 to #4.

For example, as illustrated in (K) of FIG. 18, a monitor application executed by the node #4 changes the memory token "777" stored in the node #4 to "888" at an arbitrary timing. Furthermore, the node #4 distributes the new memory token "888" to the nodes #1 to #3 as an access token.

At this point, because the application in the node #1 has failed and thus does not communicate with the other nodes #2 to #4, the application in the node #1 does not update the access token "777" to the new access token "888", as illustrated in (L) of FIG. 18. In contrast, as illustrated in (M) in FIG. 18, the node #2 and the node #3 can change the access token "777" to the new access token "888".

Consequently, as illustrated in (N) of FIG. 19, the node #1 having the failed application does not access the node #4; however, the node #2 and the node #3 can continue accessing the node #4. Accordingly, each of the nodes #1 to #4 can easily disconnect the failed node.

Furthermore, each of the nodes #1 to #4 does not need to determine whether a failure has occurred in an application due to a process, such as handshaking. Specifically, Each of the nodes #1 to #4 can disconnect a failed node without identifying which node has failed. Accordingly, each of the nodes #1 to #4 can immediately disconnect a failed node.

In the following, the flow of the memory access process performed by using both a memory token and an access token will be described with reference to FIGS. 20 to 25. Furthermore, a description will be given of an example in which the node #1 that includes the core 30a and the memory 19 transmits a memory access request to the node #2 that includes a core 30g, a memory 19a, and a memory 19b. The memory 19a is a memory that only includes a local area and the memory 19b is a memory that only includes a shared memory area.

In the following description, the application is an application executed by each of the nodes #1 and #2, the OS is an OS independently operated by each of the nodes #1 and #2, and the shared memory driver is a driver that controls the shared memory area. Any method can be used for requesting a token or implementing communication between nodes as long as communication between applications in nodes can be performed. This can be implemented by using, for example, message communication via a LAN, message communication using a shared memory via an interconnection, and communication using a shared storage.

Figure 20:
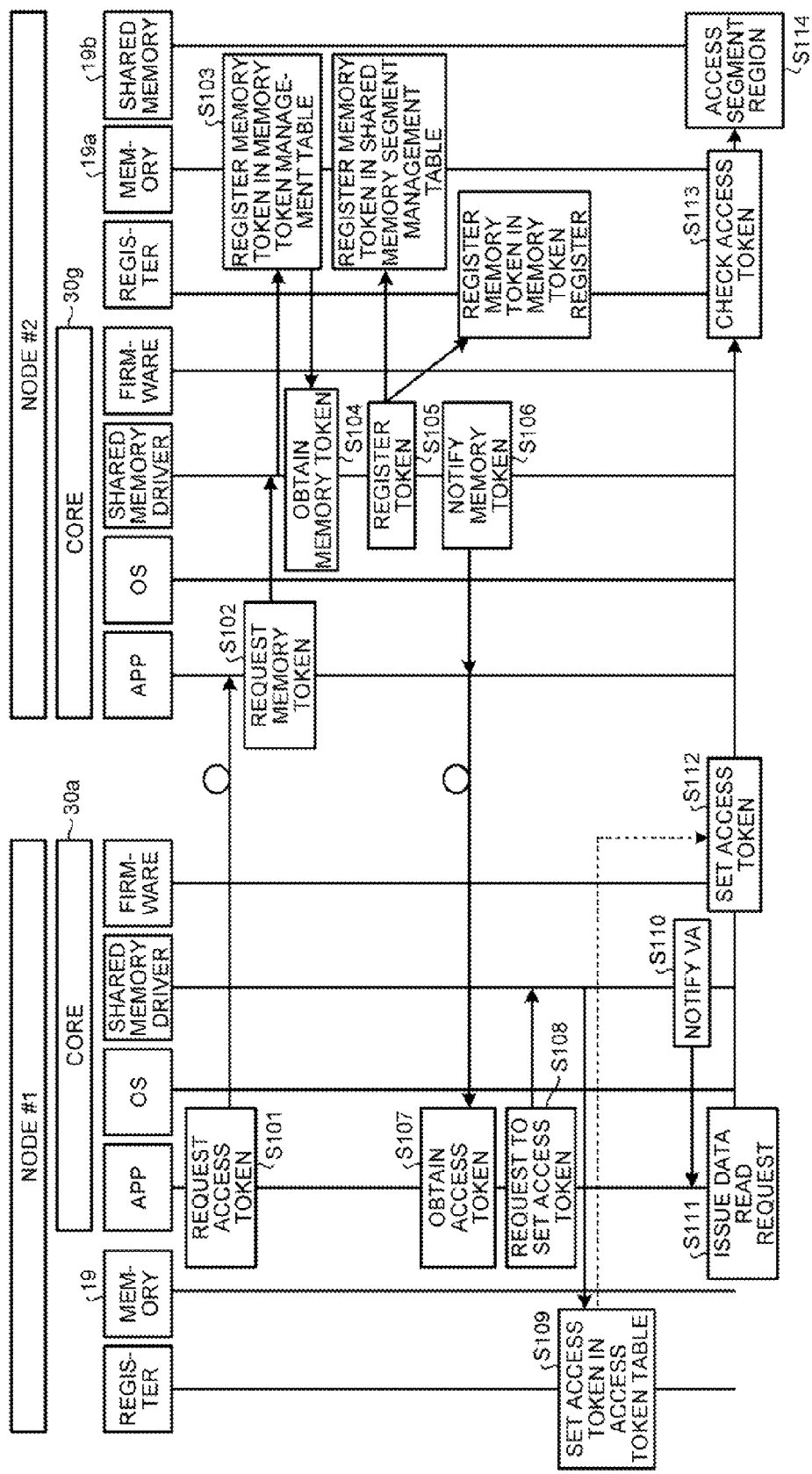
FIG. 20 is a sequence diagram illustrating the flow of a process for obtaining an access token.

First, the flow of a process for obtaining an access token performed by the node #1 will be described with reference to FIG. 20. FIG. 20 is a sequence diagram illustrating the flow of a process for obtaining an access token. For example, the application executed by the core 30a requests an access token from the application executed by the core 30g (Step S101). Then, the application executed by the core 30g requests the shared memory driver to allocate a memory token (Step S102).

Then, the shared memory driver executed by the core 30g refers to the memory token management table stored in the memory 19a. Furthermore, the shared memory driver executed by the core 30g registers a memory token that has not been used in the memory token management table (Step S103) and obtains the memory token (Step S104). At this point, the shared memory driver executed by the core 30g also registers an application ID of a process that is used by the memory token.

Furthermore, the shared memory driver executed by the core 30g registers the obtained memory token in the shared memory segment management table and the memory token register (Step S105). At this point, the shared memory driver executed by the core 30g also registers, for example, a segment number to be accessed, a use flag, and an application ID. Furthermore, the shared memory driver executed by the core 30g notifies the application executed by the core 30a of the memory token as an access token (Step S106).

In contrast, when the application executed by the core 30a obtains the access token (Step S107), the application executed by the core 30a requests the shared memory driver executed by the core 30a to set the obtained access token (Step S108). Then, the shared memory driver executed by the core 30a sets the obtained access token in the access token table 31 (Step S109).

Subsequently, the shared memory driver executed by the core 30a notifies the application executed by the core 30a of a virtual address (VA) to be accessed (Step S110). Then, the application executed by the core 30a issues a data read request (Step S111). At this point, the access token that is set in the access token table 31 is set in the data read request (Step S112).

Then, the node #2 determines whether the access token that is set in the data read request matches the memory token registered in the memory token register (Step S113). Then, if the access token matches the memory token, the node #2 permits access to the segment region (Step S114).

Figure 21:
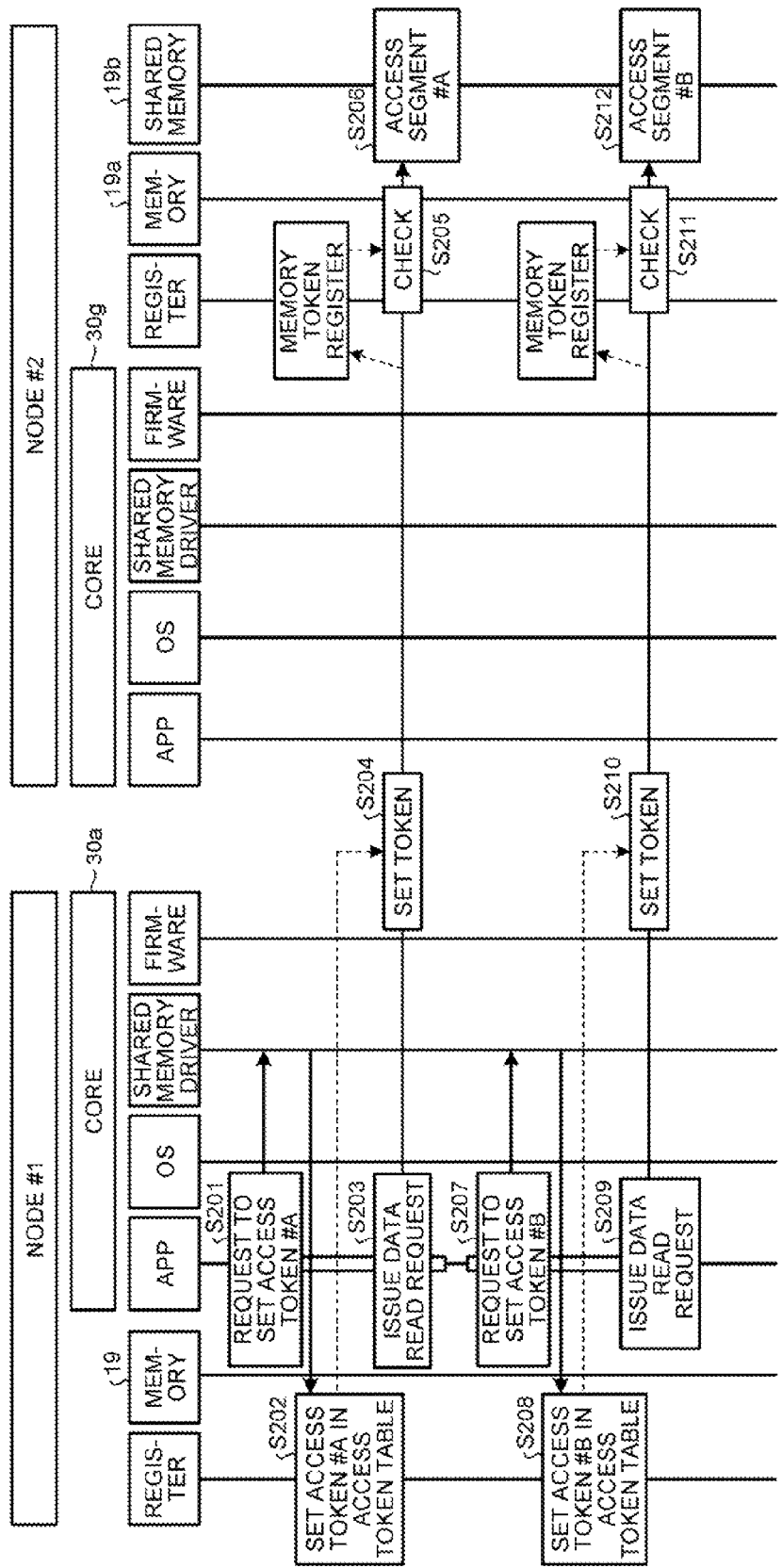
FIG. 21 is a sequence diagram illustrating the flow of a process for accessing multiple segments.

In the following, an example in which the node #1 accesses multiple segments in the node #2 will be described with reference to FIG. 21. FIG. 21 is a sequence diagram illustrating the flow of a process for accessing multiple segments. For example, the application executed by the core 30a requests the shared memory driver executed by the core 30a to set an access token #A that is used to access the segment #A in the memory 19b (Step S201). Then, the shared memory driver executed by the core 30a sets the access token #A in the access token table 31 (Step S202).

Furthermore, the application executed by the core 30a issues a data read request with respect to the segment #A (Step S203). At this point, the access token #A is set in the data read request (Step S204). Then, the node #2 determines whether the access token #A that is set in the data read request matches the memory token in the segment #A (Step S205). If the access token #A matches the memory token in the segment #A, the node #2 permits the memory access with respect to the segment #A (Step S206).

Furthermore, the application executed by the core 30a requests the shared memory driver executed by the core 30a to set an access token #B that is used to access the segment #B in the memory 19b (Step S207). Then, the shared memory driver executed by the core 30a sets the access token #B in the access token table 31 (Step S208).

Furthermore, the application executed by the core 30a issues a data read request with respect to the segment #B (Step S209). At this point, the access token #B is set in the data read request (Step S210). Then, the node #2 determines whether the access token #B that is set in the data read request matches the memory token in the segment #B (Step S211). If the access token #B matches the memory token in the segment #B, the node #2 permits a memory access with respect to the segment #B (Step S212).

Figure 22:
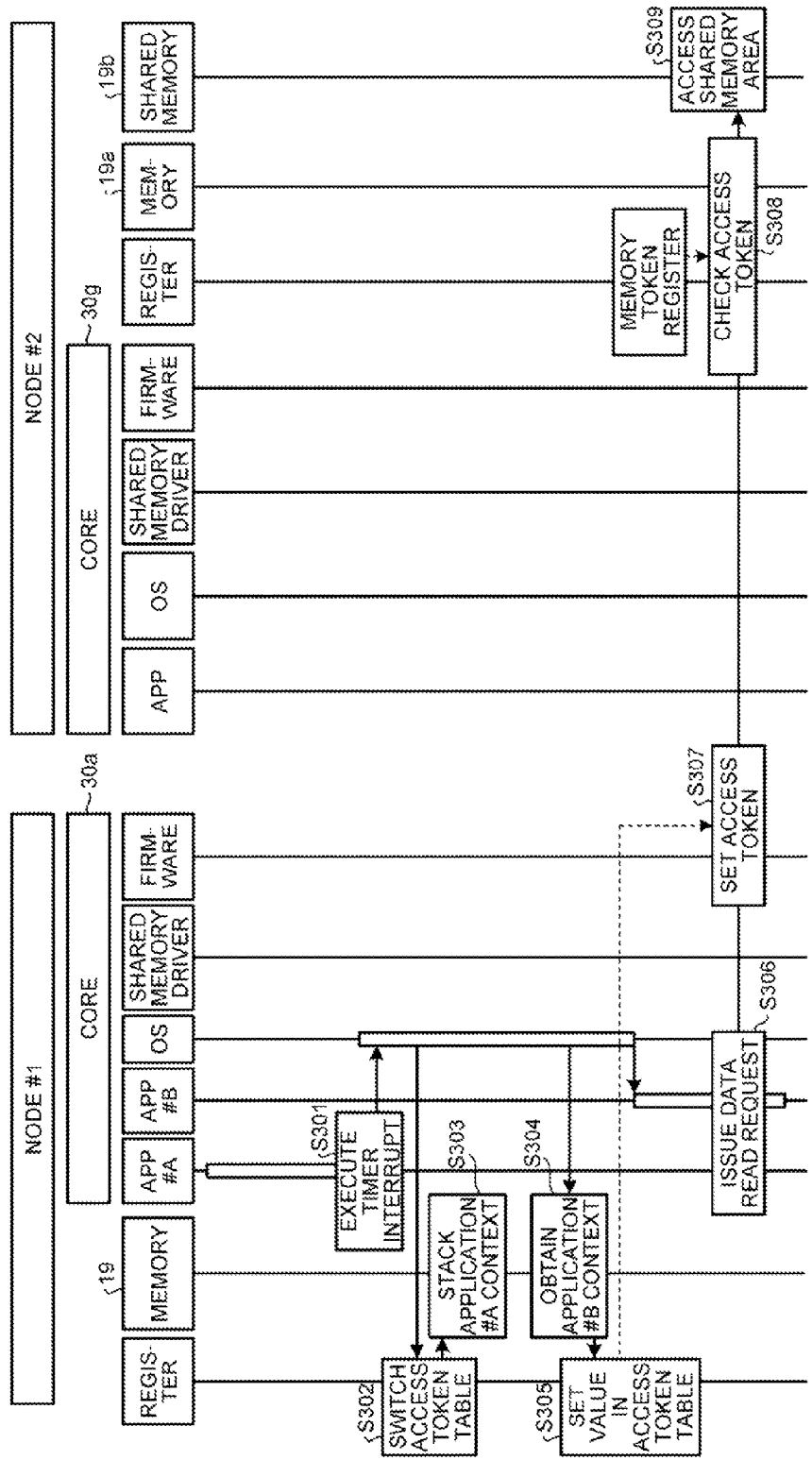
FIG. 22 is a sequence diagram illustrating the flow of a context switch.

In the following, the flow of a process in which data in the access token table 31 stacked when a context switch occurs will be described with reference to FIG. 22. FIG. 22 is a sequence diagram illustrating the flow of a context switch. In the example illustrated in FIG. 22, a description will be given of the flow of a process to switch an application to be executed to an application #B because an interrupt process has occurred when the application #A is being executed by the core 30a.

For example, a timer interrupt occurs when the core 30a is running the application #A (Step S301). In such a case, the OS executed by the core 30a executes a context switch including data in the access token table 31 (Step S302) and stacks values of registers in the memory 19 (Step S303). Then, the OS executed by the core 30a obtains the values of registers stacked in the memory obtained when the application #B 19 is being executed (Step S304). Then, the OS executed by the core 30*a* sets the obtained values in the access token table 31 (Step S305).

Subsequently, the application #B executed by the core 30*a* issues a data read request (Step S306). Then, the access token that is set in the access token table 31, i.e., the access token used by the application #B, is set in the data read request (Step S307). Then, the node #2 determines whether the memory token in the segment used by the application #B matches the access token that is set in the data read request (Step S308). If the memory token matches the access token, the node #2 permits the access to the shared memory area (Step S309).

Figure 23:
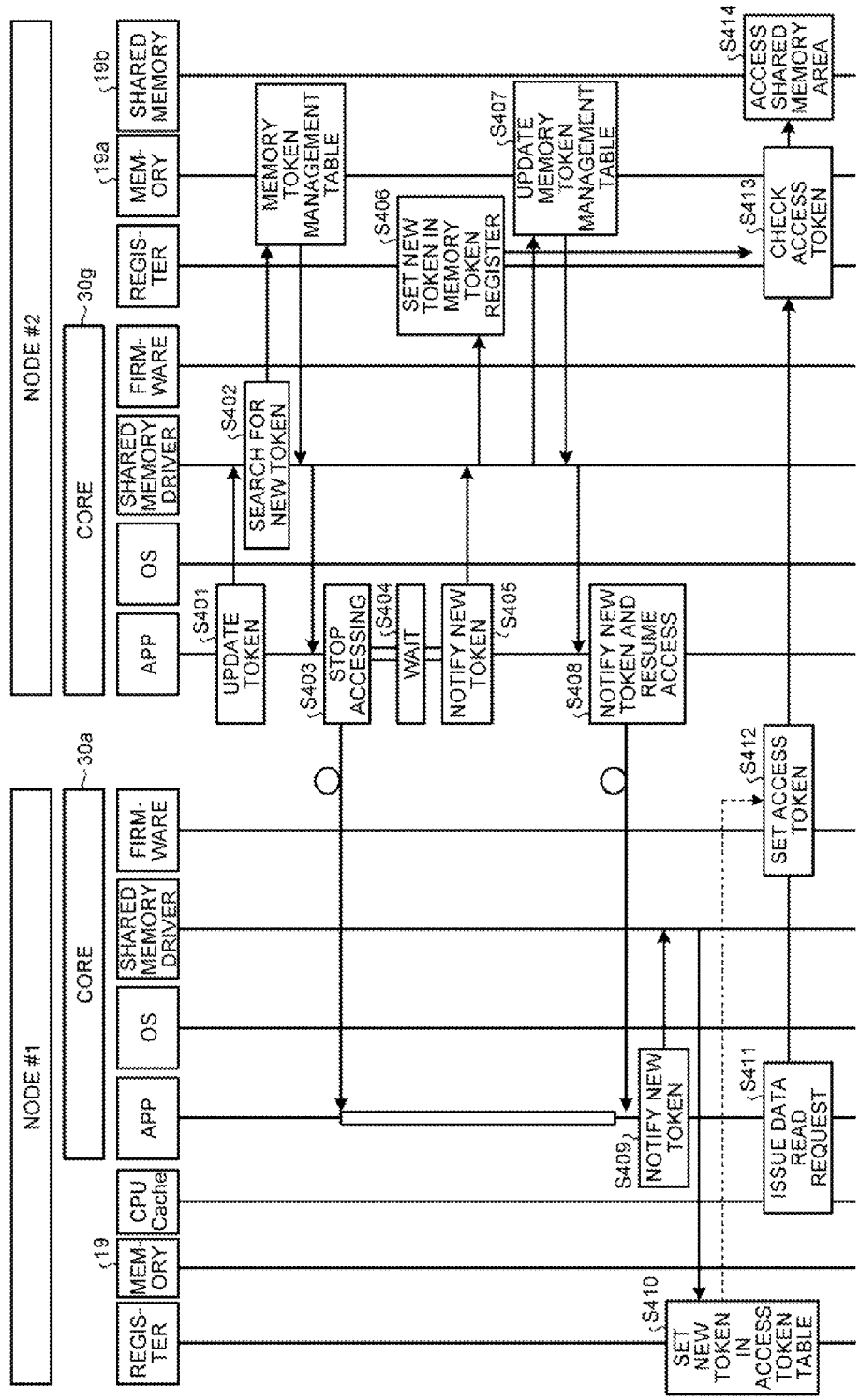
FIG. 23 is a sequence diagram illustrating the flow of a process for changing a memory token.

In the following, the flow of a process for changing a memory token performed by the node #2 will be described with reference to FIG. 23. FIG. 23 is a sequence diagram illustrating the flow of a process for changing a memory token. In the example illustrated in FIG. 23, a description will be given of an example in which a failure has not occurred in the node #1 and thus the node #2 can correctly access. It is assumed that processes performed Steps S411 to S414 illustrated in FIG. 23 are the same as those performed at Steps S306 to S309 illustrated in FIG. 22; therefore descriptions thereof will be omitted here.

For example, the application executed by the core 30*g* requests the shared memory driver executed by the core 30*g* to update a token at an arbitrary timing (Step S401). Then, the shared memory driver executed by the core 30*g* searches the memory token management table for a new available memory token (Step S402) and notifies the application executed by the core 30*g* of the new memory token to be used. Subsequently, the application executed by the core 30*g* issues an access stop request to the application that is executed by the core 30*a* (Step S403) and waits for a predetermined time period (Step S404).

Then, the application executed by the core 30*g* notifies the shared memory driver executed by the core 30*g* of the new memory token to be used (Step S405). In such a case, the shared memory driver executed by the core 30*g* sets the new memory token in the memory token register (Step S406). Furthermore, the shared memory driver executed by the core 30*g* updates the memory token management table (Step S407).

Then, the application executed by the core 30*g* notifies the application executed by the core 30*a* of the new access token and the resumption of the memory access (Step S408). In such a case, the application executed by the core 30*a* notifies the shared memory driver executed by the core 30*a* of the new access token (Step S409). Then, the shared memory driver executed by the core 30*a* sets the new access token in the access token table 31 (Step S410).

Figure 24:
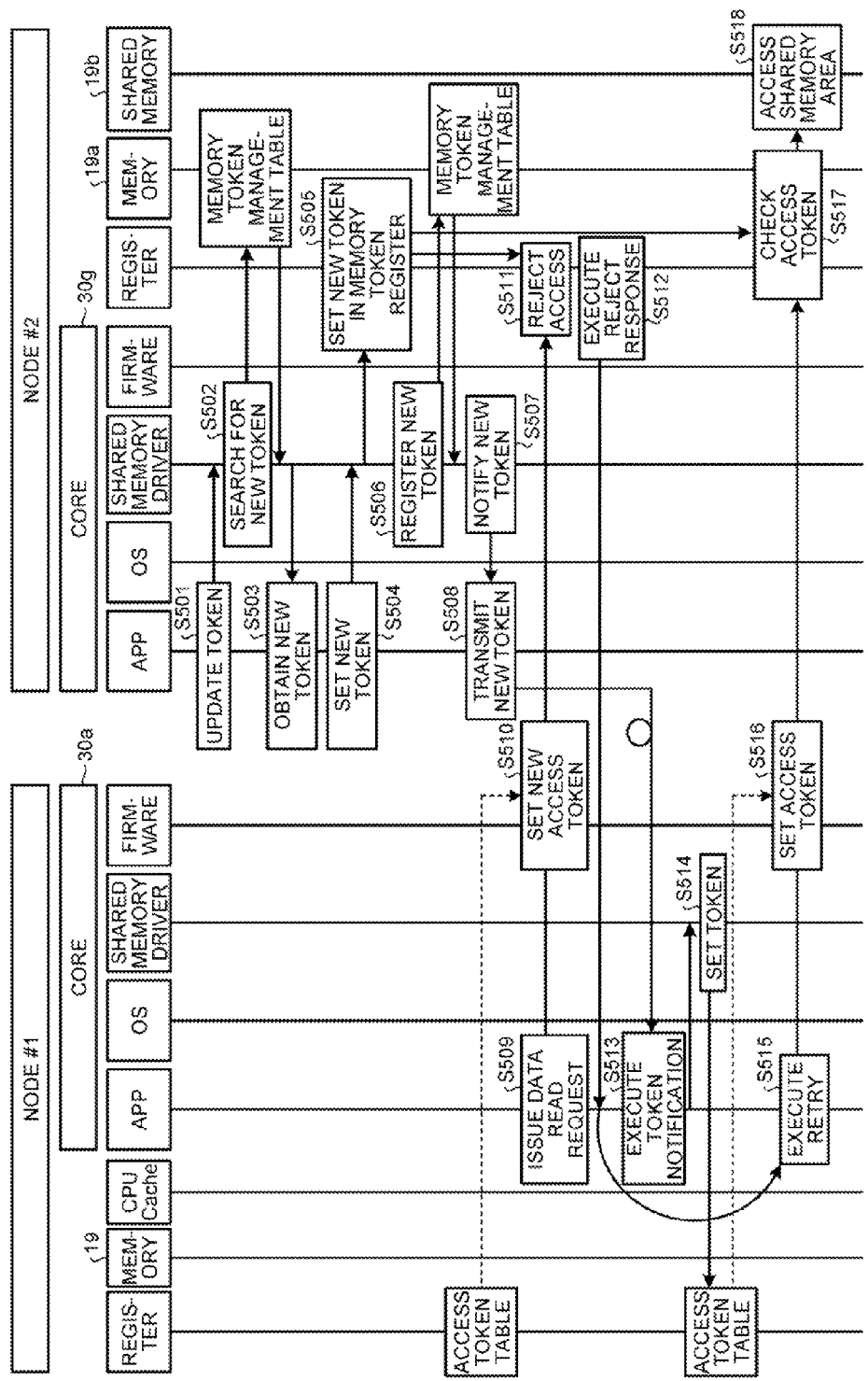
FIG. 24 is a sequence diagram illustrating the variation of the process for changing the memory token.

When a retry of the memory access is permitted, there is no need to wait when a process for changing a memory token is executed. Accordingly, the variation of the process for changing the memory token performed by the node #2 will be described with reference to FIG. 24. FIG. 24 is a sequence diagram illustrating the variation of the process for changing the memory token. In the example illustrated in FIG. 24, a description will be given of an example in which a failure has not occurred in the node #1 and thus the node #2 correctly accesses after the memory token has been changed.

For example, the application executed by the core 30*g* requests the shared memory driver executed by the core 30*g* to update a token at an arbitrary timing (Step S501). Then, the shared memory driver executed by the core 30*g* searches the memory token management table for a new available memory token (Step S502) and notifies the application executed by the core 30*g* of the new memory token to be used (Step S503).

Then, the application executed by the core 30*g* notifies the shared memory driver executed by the core 30*g* of the new memory token to be used (Step S504). In such a case, the shared memory driver executed by the core 30*g* sets the new memory token in the memory token register (Step S505). Furthermore, the shared memory driver executed by the core 30*g* registers the new memory token in the memory token management table (Step S506) and notifies the application executed by the core 30*g* that the new memory token has been registered (Step S507).

Furthermore, the application executed by the core 30*g* transmits the new access token to the application executed by the core 30*a* (Step S508). At this point, the application executed by the core 30*a* issues a data read request (Step S509). Then, the shared memory driver executed by the core 30*a* sets the new access token in the access token table 31 (Step S510).

However, the access token that is set at Step S510 does not match the new memory token and thus the memory access is rejected (Step S511). Accordingly, the node #2 transmits, to the node #1, a response indicating the rejection of the access (Step S512). At this point, because the application executed by the core 30*a* receives the new access token from the application executed by the core 30*g*, the application executed by the core 30*a* notifies the shared memory driver executed by the core 30*a* of the token (Step S513). Then, the shared memory driver executed by the core 30*a* sets the new access token in the access token table 31 (Step S514).

Thereafter, the application executed by the core 30*a* transmits a retry containing the data read request (Step S515). Then, the new access token is set in the retry containing the data read request (Step S516). Consequently, the node #2 determines whether the memory token in the segment used by the application #B matches the access token that is set in the data read request (Step S517).

If the memory token matches the access token, the node #2 permits the access to the shared memory area (Step S518). Furthermore, if the access token that is set in the retry received from the node #1 does not match the memory token, the node #2 determines that a memory access error has occurred; therefore, the node #2 may executes a process for disconnecting the node #1.

Figure 25:
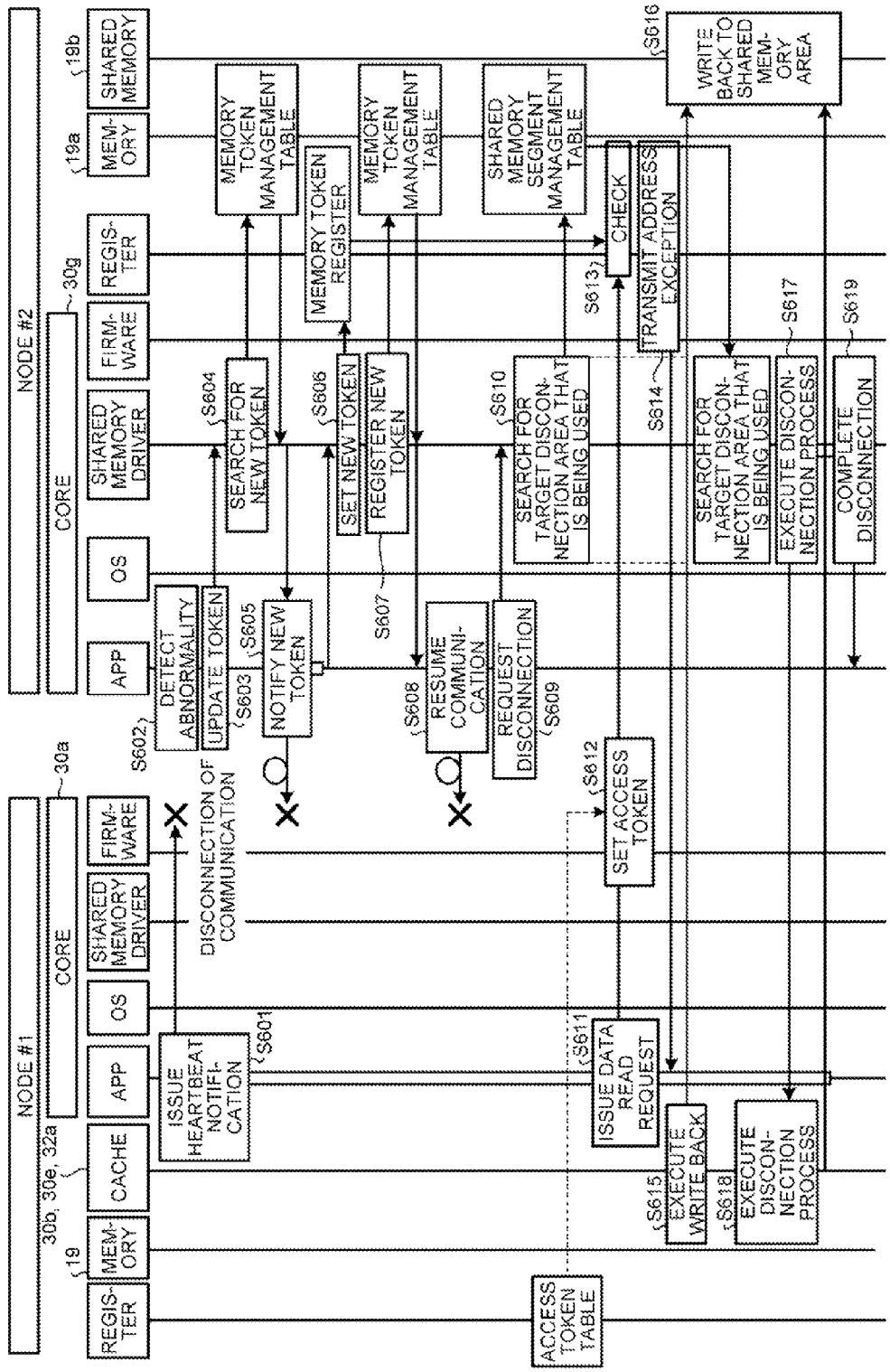
FIG. 25 is a sequence diagram illustrating the flow of a process for disconnecting a failed node.

In the following, a description will be given of the flow of a process, with reference to FIG. 25, in which a failure has occurred in the node #1 when the node #2 changed the memory token and thus the node #1 is disconnected because an access is not correctly performed. FIG. 25 is a sequence diagram illustrating the flow of a process for disconnecting a failed node.

In the example illustrated in FIG. 25, a description will be given of an example in which a failure has occurred in the node #1 and thus communication with the node #2 is not performed. Furthermore, in the example illustrated in FIG. 25, it is assumed that the node #1 issues a heartbeat notification at predetermined time intervals to the node #2 to be accessed.

First, the application executed by the core 30*a* issues a heartbeat notification (Step S601). However, because a failure has occurred in the node #1, the heartbeat notification is not delivered to the node #2. Accordingly, the application executed by the core 30*g* detects the abnormality of the node #1 (Step S602). Then, the application executed by the core 30*g* requests the shared memory driver executed by the core 30*g* to update a memory token (Step S603). Then, the shared memory driver executed by the core 30*g* searches the memory token management table for a new memory token (Step S604) and notifies the application executed by the core 30g of the new memory token.

Then, the application executed by the core 30g transmits the new memory token to the node #1 as an access token; however, because a failure has occurred in the node #1, the new access token does not reach the node #1. Then, the application executed by the core 30g notifies the shared memory driver executed by the core 30g of the new memory token to be used (Step S605).

In such a case, the shared memory driver executed by the core 30g sets the new memory token in the memory token register (Step S606). Furthermore, the shared memory driver executed by the core 30g registers the new memory token in the memory token management table (Step S607) and notifies the application executed by the core 30g that the new memory token has been registered.

Furthermore, the application executed by the core 30g notifies the node #1 of a resumption notification of the communication (Step S608); however, because a failure has occurred in the node #1, the resumption notification of the communication does not reach the node #1. Accordingly, the application executed by the core 30g issues a request for disconnecting the node #1 to the shared memory driver executed by the core 30g (Step S609). Then, the shared memory driver executed by the core 30g searches the shared memory segment management table for a shared memory area that is used by the node #1 to be disconnected (Step S610).

At this point, when the application executed by the core 30a issues a data read request (Step S611), the node #1 sets the access token in the data read request (Step S612) and transmits the access token to the node #2. However, because the access token does not match the new memory token (Step S613), the node #2 rejects the memory access and transmits an address exception to the node #1 (Step S614).

In such a case, the node #1 executes a write back process in which the data stored in the L1 cache 30b, the L1 cache 30e, and the L2 cache 32a are transmitted to the node #2 (Step S615). When the node #2 obtains the write back data from the node #1 in this way, the node #2 executes the write back to the shared memory area without determining whether the memory access can be performed (Step S616).

Then, by using a cache flush and an implicit write back, the node #1 and the node #2 allow the data retained in each of the L1 caches 30b and 30e and the L2 cache 32a to match the data retained in the memory 19b. Then, the node #2 moves the job of the process executed by the core 30a in the node #1 to the process executed by another CPU and executes the disconnection process for disconnecting the node #1 (Steps S617 and S618). Then, the shared memory driver executed by the core 30g notifies the application executed by the core 30g indicating that the disconnection of the node #1 has been completed (Step S619).

Figure 26:
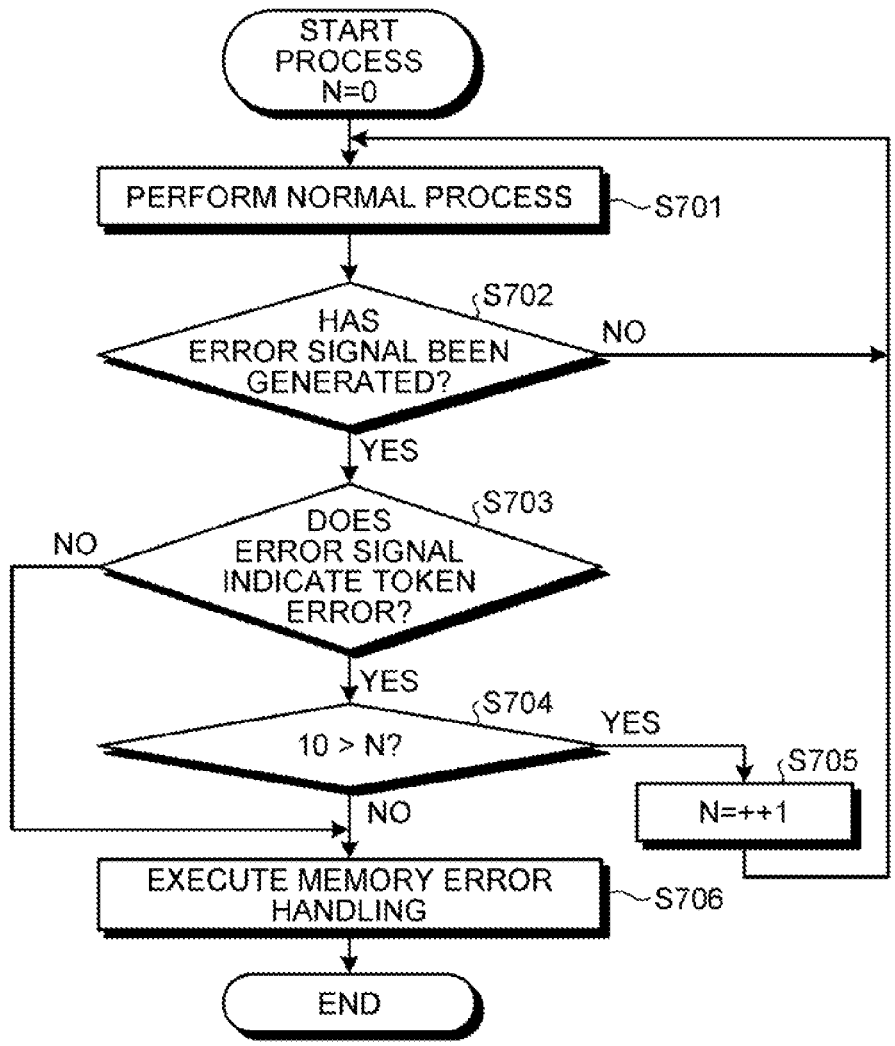
FIG. 26 is a flowchart illustrating the flow of a process for changing a memory token.

In the following, an example of a process for changing a memory token will be described with reference to FIG. 26. FIG. 26 is a flowchart illustrating the flow of a process for changing a memory token. In the example illustrated in FIG. 26, it is assumed that the CPU 12 counts the number of token errors of a memory access request for each process, which is represented by "N". Furthermore, before the CPU 12 executes the process illustrated in FIG. 26, the CPU 12 sets an initial value "0" in "N" in each process. Furthermore, FIG. 26 illustrates an example in which a node in which 10 or more retries are failed is disconnected by using the memory error handling.

For example, the CPU 12 executes, as a normal process, a memory access request that is performed in accordance with both a memory token and an access token (Step S701). At this point, the CPU 12 determines whether an error signal is generated (Step S702). The error signal is a signal that is notified when an error occurs and is a signal that is notified when, for example, an error is stored in the error register 43.

At this point, if the CPU 12 determines that an error signal is generated (Yes at Step S702), the CPU 12 determines whether the contents of the error indicated by the error signal is a token error indicating that the memory token does not match the access token (Step S703). If the CPU 12 determines that the contents of the error indicated by the error signal is the token error (Yes at Step S703), the CPU 12 executes the following process. Namely, the CPU 12 determines whether the value of "N" of the process that requests the memory access resulting in the token error is less than "10" (Step S704).

If the CPU 12 determines that the value of "N" of the process that requests the memory access is less than "10" (Yes at Step S704), the CPU 12 adds "1" to the value of "N" of the process that requests the memory access (Step S705). Then, the CPU 12 again executes the normal process (Step S701).

Furthermore, if the CPU 12 determines that the value of "N" of the process that requests the memory access is equal to or greater than "10" (No at Step S704), the CPU 12 executes the following process. Namely, the CPU 12 executes the memory error handling (Step S706), disconnects the node that executes the process for requesting the memory access, and ends the process.

Figure 27:
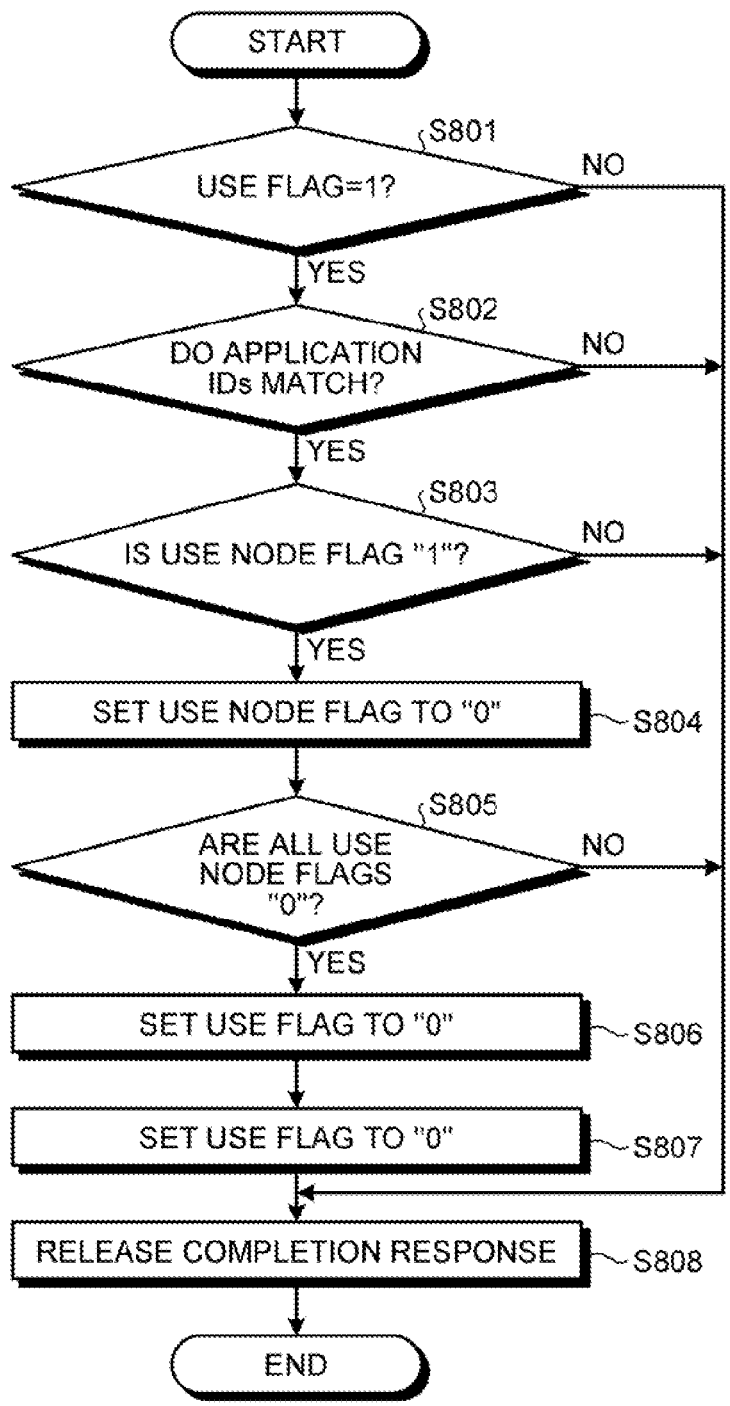
FIG. 27 is a flowchart illustrating the flow of a process for updating the shared memory segment management table and the memory token management table.

In the following, a description will be given of a process for updating both the shared memory segment management table and the memory token management table when the CPU 12 disconnects a node. FIG. 27 is a flowchart illustrating the flow of a process for updating the shared memory segment management table and the memory token management table. The CPU 12 executes the process illustrated in FIG. 27 for each entry in the shared memory segment management table. Furthermore, the CPU 12 executes the process illustrated in FIG. 27 triggered when a segment release request is obtained from a process executed by a node that corresponds to the issue source of a memory access request.

For example, the CPU 12 refers to a use flag and determines whether the use flag is "1" (Step S801). If the use flag is "1" (Yes at Step S801), the CPU 12 determines whether the application ID of the process that issues the segment release request matches an application ID of an entry (Step S802).

If the CPU 12 determines that the application IDs do match (Yes at Step S802), the CPU 12 determines whether the use node flag of the node that executes the process issuing a segment release request is "1" (Step S803). If the use node flag of the node that executes the process issuing the segment release request is "1" (Yes at Step S803), the CPU 12 sets the use node flag of the node that executes the process issuing the segment release request to "0" (Step S804).

Then, the CPU 12 determines whether another use node flag is "0" (Step S805). If the other use node flag is "0" (Yes at Step S805), the CPU 12 sets the use node flag to "0" (Step S806). Then, the CPU 12 identifies the value of the memory token of the entry and searches the entries in the memory token management table for an entry that stores therein a memory token having the same value as the value identified. Then, the CPU 12 sets the use flag of the searched entry to "0" (Step S807).

Then, the CPU 12 issues a completion response indicating that the disconnection of the node has been completed (Step S808) and ends the process. Furthermore, if the use flag is not "1" (No at Step S801), the application IDs do not match (No at Step S802), or the use node flag is "0" (No at Step S803), the CPU 12 issues a completion response (Step S808). Furthermore, if neither of the use node flags are "0" (No at Step S805), the CPU 12 issues a completion response (Step S808).

FIG. 28 is a schematic diagram illustrating an update of the shared memory segment management table. For example, as illustrated by the shaded area in FIG. 28, by executing the processes at Steps S804 and S806 illustrated in FIG. 27, the CPU 12 sets both the use flag and the use node flag to "0".

FIG. 29 is a schematic diagram illustrating an update of the memory token management table. For example, as illustrated by the shaded area in FIG. 29, by executing the process at Step S807 illustrated in FIG. 27, the CPU 12 sets the use flag to "0". In this way, by executing the processes illustrated in FIG. 27, the CPU 12 can disconnect a node by properly updating the shared memory segment management table and the memory token management table.

Advantage of the first embodiment

As described above, each of the CPUs 12 to 15 and 12a to 12m has the access token tables 31 and 31a. Furthermore, each of the CPUs 12 to 15 and 12a to 12m attaches an access token to a memory access request to be transmitted to another node and transmits the memory access request. Furthermore, each of the CPUs 12 to 15 and 12a to 12m includes a memory token register that stores therein a memory access token having the same value as the value of the access token that is transmitted to a CPU that issues a memory access request to the corresponding CPU. Then, each of the CPUs 12 to 15 and 12a to 12m controls the execution of the memory access request on the basis of both the access token of the received memory access request and the memory token stored in the memory token register.

Accordingly, by changing the memory token stored in the memory token register in the corresponding CPU, each of the CPUs 12 to 15 and 12a to 12m prevents the execution of the memory access request issued by a failed node. Consequently, the information processing system 1 can avoid the occurrence of the split-brain, thus correctly executing a failover.

Furthermore, when changing the memory token, each of the CPUs 12 to 15 and 12a to 12m notifies a node corresponding to the issue source of a memory access request of a new memory token as an access token. Then, if the memory token matches an access token of the received memory access request, each of the CPUs 12 to 15 and 12a to 12m permits to execute the memory access request.

Accordingly, each of the CPUs 12 to 15 and 12a to 12m can prevent memory access performed by a failed node without determining whether a failure has occurred in an access source node. Consequently, each of the CPUs 12 to 15 and 12a to 12m can immediately and easily disconnect a node when compared with a method for determining whether a failure has occurred in an access source node by using handshaking.

Furthermore, when each of the CPUs 12 to 15 and 12a to 12m rejects a memory access request, each of the CPUs 12 to 15 and 12a to 12m updates a memory token and then writes the data, which is cached by a CPU in a node that corresponds to the issue source of the memory access request, back to a memory accessed by the CPU. Accordingly, even if each of the CPUs 12 to 15 and 12a to 12m includes a cache memory, each of the CPUs 12 to 15 and 12a to 12m can correctly disconnect a node while maintaining the cache coherency.

Furthermore, each of the CPUs 12 to 15 and 12a to 12m transmits a new access token together with an instruction to stop accessing the issue source of the memory access request. Then, each of the CPUs 12 to 15 and 12a to 12m updates the memory token after the predetermined duration and instructs the issue source of the memory access request to resume the access.

Accordingly, each of the CPUs 12 to 15 and 12a to 12m can reject the memory access from a failed node without receiving a retry from the issue source of the memory access request. Consequently, when each of the CPUs 12 to 15 and 12a to 12m does not permit the memory access request, each of the CPUs 12 to 15 and 12a to 12m can properly disconnect a failed node without determining the type of error occurring in the node.

Furthermore, if memory access with respect to another node is not permitted, each of the CPUs 12 to 15 and 12a to 12m may perform a retry. Specifically, each of the CPUs 12 to 15 and 12a to 12m has the function for retrying the same memory access request if the memory access is not permitted.

In such a case, each of the CPUs 12 to 15 and 12a to 12m can correctly disconnect a failed node instead of waiting when a new access token is notified. Specifically, because there is a time lag between the time when an access source node performs memory access by using a changed access token and the time when an access destination node changes the memory token, an access may possibly rejected.

For example, in some cases, access may possibly be rejected because an access source node attaches an access token that has not been changed and an access destination node determines whether an access can be performed by using a changed memory token. Similarly, in some cases, an access may possibly be rejected because an access source node attaches a changed access token and an access destination node determines whether access can be performed by using a memory token that has not been changed.

At this point, if an access is rejected, the access source node transmits a retry. Then, the access source node that operates normally attaches an access token obtained when the memory access is retried. Then, the access destination node determines whether an access can be performed by using the changed memory token. Consequently, each of the CPUs 12 to 15 and 12a to 12m can permit the memory access determined by the access source node that normally operates.

In contrast, the access source node that does not normally operate attaches an access token that has not been changed to a retry of the memory access and the access destination node determines whether an access can be performed by using the changed memory token. Consequently, each of the CPUs 12 to 15 and 12a to 12m determines whether a retry of the memory access performed by the access source node that does not normally operate is permitted and disconnects a node corresponding to the issue source of the retry.

If each of the CPUs 12 to 15 and 12a to 12m rejects a retry of the memory access, a CPU in a node that corresponds to the issue source of the memory access request writes the cached data back to the memory that is access by the CPU. Accordingly, each of the CPUs 12 to 15 and 12a to 12m can correctly disconnect the node while maintaining the cache coherency.

Furthermore, each of the CPUs 12 to 15 and 12a to 12m uses a register in which data is stacked when performing a context switch as an access token table. Accordingly, even when a process is executed by using multi-threading, each of the CPUs 12 to 15 and 12a to 12m can prevent memory access performed from a failed node and correctly execute a failover without making an OS or an application complicated.

[b] Second Embodiment

In the above explanation, a description has been given of the embodiment according to the present invention; however, the embodiment is not limited thereto and can be implemented with various kinds of embodiments other than the embodiments described above. Accordingly, in the following, another embodiment included in the present invention will be described as a second embodiment.

(1) Access Token Table

The CPU 12 described above includes the access token tables 31 and 31*a* in the cores 30*a* and 30*d*, respectively; however, the embodiment is not limited thereto. For example, if the core 30*a* is a multi-thread capable core, the CPU 12 may also use an access token table for each hardware thread.

Figure 30:
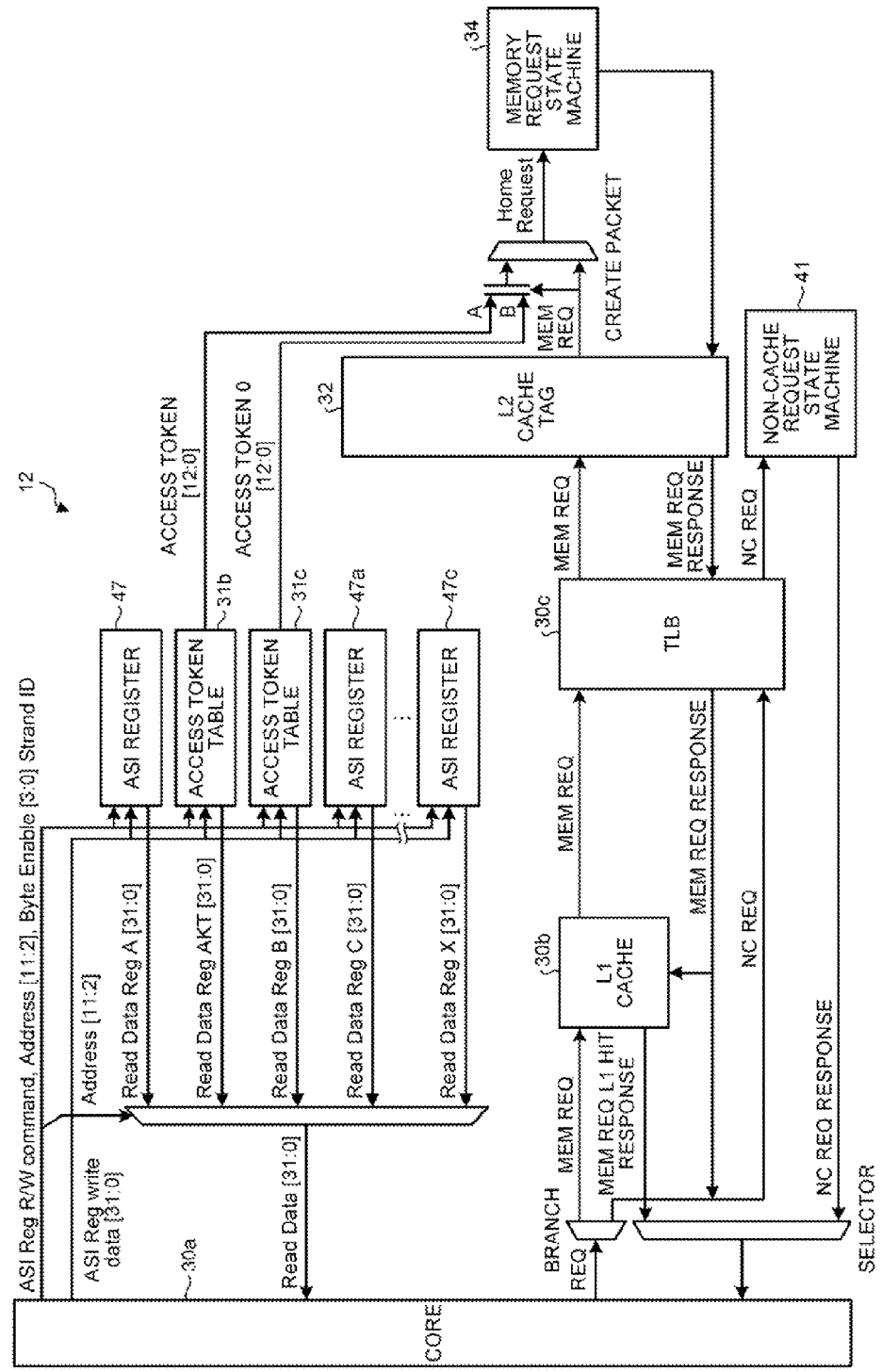
FIG. 30 is a schematic diagram illustrating an example of a multi-thread-capable access token table.

For example, FIG. 30 is a schematic diagram illustrating an example of a multi-thread-capable access token table. In the example illustrated in FIG. 30, the core 30*a* has two hardware threads. In such a case, the CPU 12 includes two access token tables 31*b* and 31*c* used by each of the hardware threads. Furthermore, the CPU 12 stores, in a packet, an access token that is used by the thread issuing the memory access request and that is output by the access token table. Furthermore, the number of access token tables is not limited to the example illustrated in FIG. 30; therefore, the CPU 12 may also have an arbitrary number of access token tables.

As described above, if the CPU 12 uses an access token table for each hardware thread, the CPU 12 prevents the memory access performed from a failed node without making an OS or an application complicated even when executing a process by using multi-threading. Consequently, the information processing system 1 can correctly perform a failover.

(2) Non-Protected Area

When the CPU 12 described above accesses a non-protected area, the CPU 12 uses "all0" as an access token and a memory token; however, the embodiment is not limited thereto. For example, it may also possible to indicate whether a target access is in a protected area or in a non-protected area by setting a valid bit in a memory token stored by the memory token register and by using the valid bit.

Figure 31:
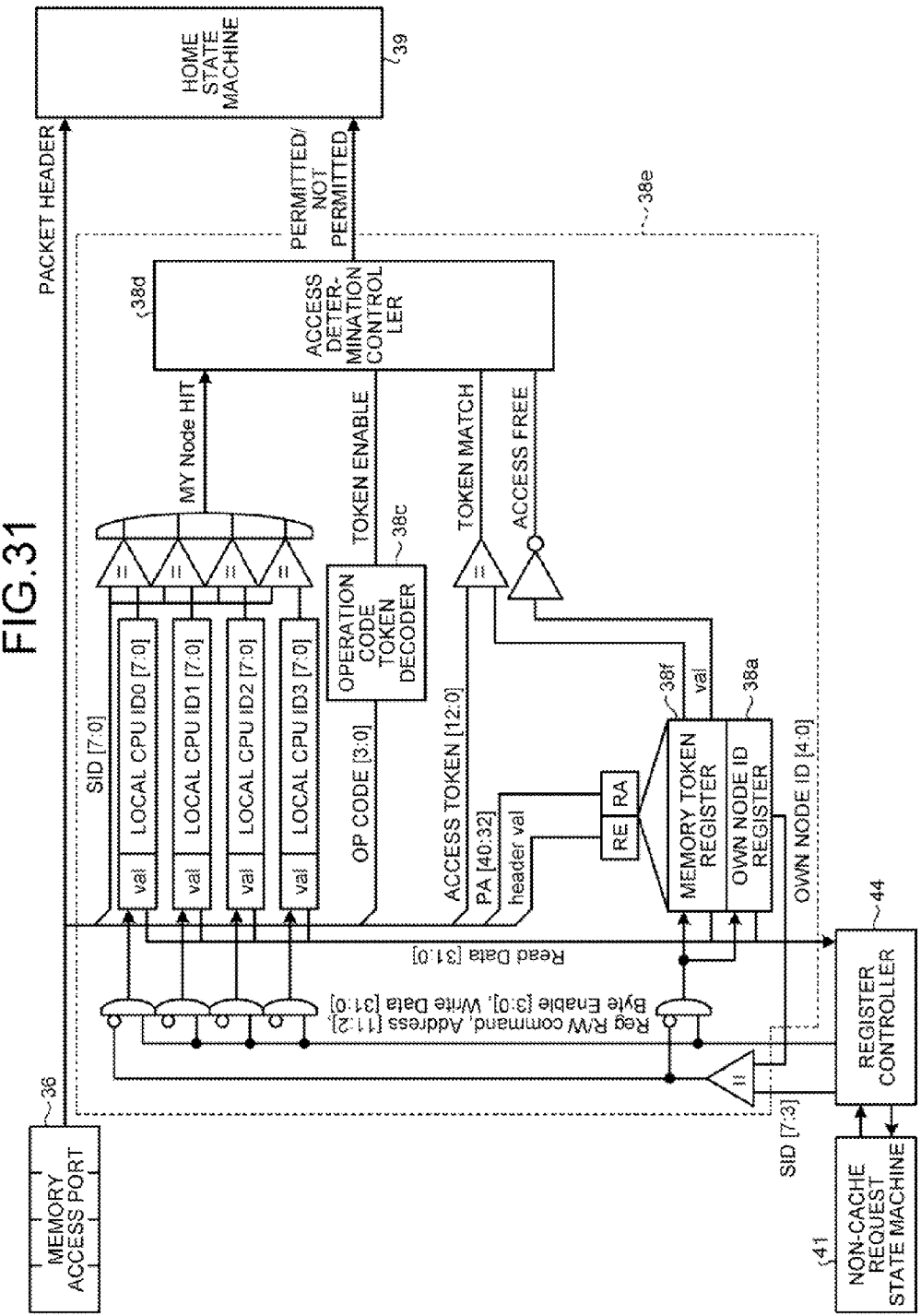
FIG. 31 is a schematic diagram illustrating the variation of the memory token checker.

For example, FIG. 31 is a schematic diagram illustrating the variation of the memory token checker. In the example illustrated in FIG. 31, a memory token checker 38*e* includes a memory token register 38*f*. The memory token register 38*f* uses a 1-bit reserve included in the memory token register 38*b* as a valid bit and stores the valid bit "0" in a field associated with the non-protected area. In such a case, if a target access is in a non-protected area, a signal indicating the access free is input to the access determination controller 38*d*; therefore, memory access can be properly implemented without setting a memory token in the non-protected area.

(3) Matching of Memory Tokens Due to Unauthorized Access

The CPU 12 described above determines whether a memory access request is executed depending on whether a memory token matches an access token; however, the embodiment is not limited thereto. For example, in addition to determining whether a memory token matches an access token, it may also possible to determine whether a node that issues a memory access request is a previously permitted node.

Figure 32:
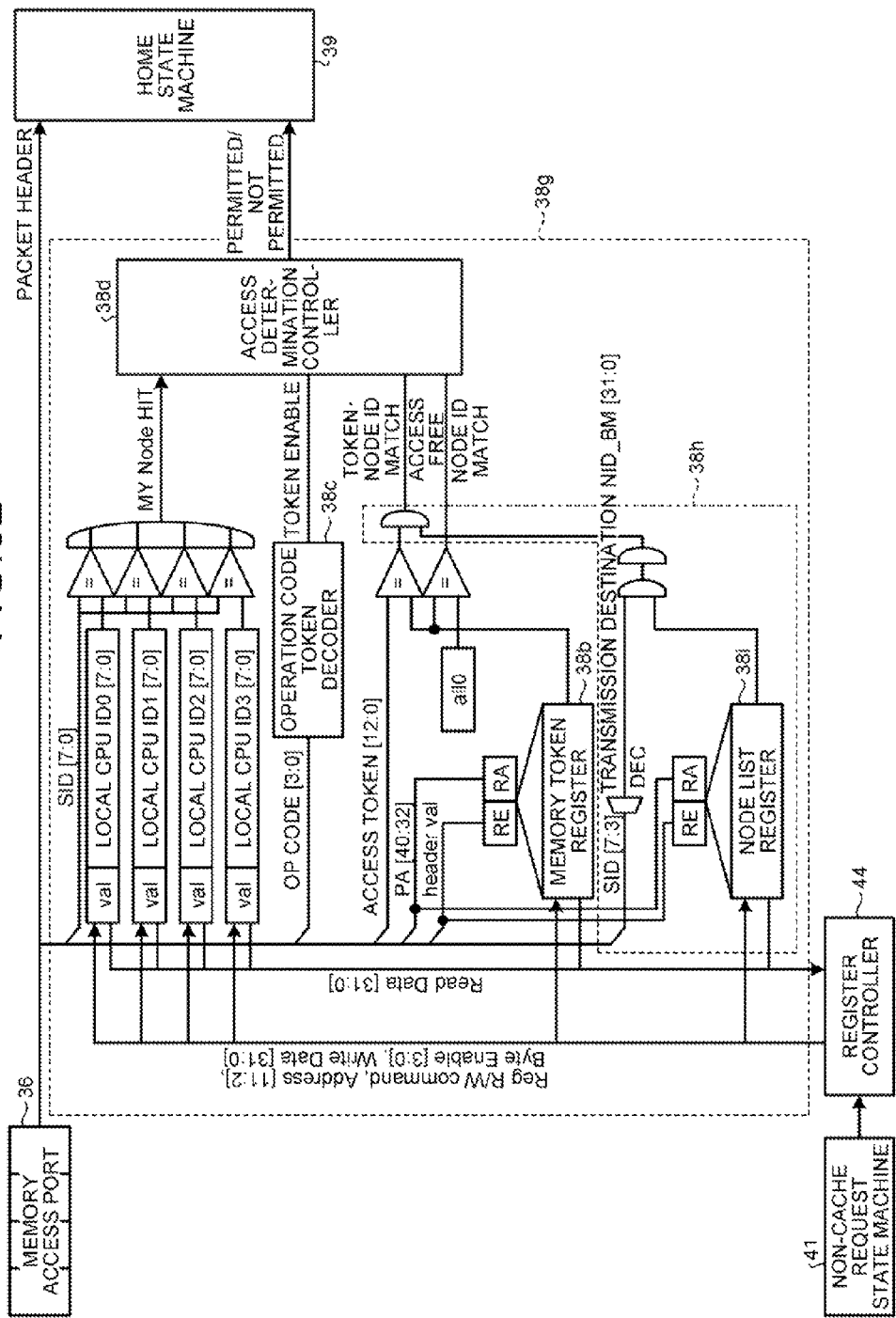
FIG. 32 is a schematic diagram illustrating a memory token checker that permits only a previously permitted node to perform memory access.
Figure 33:
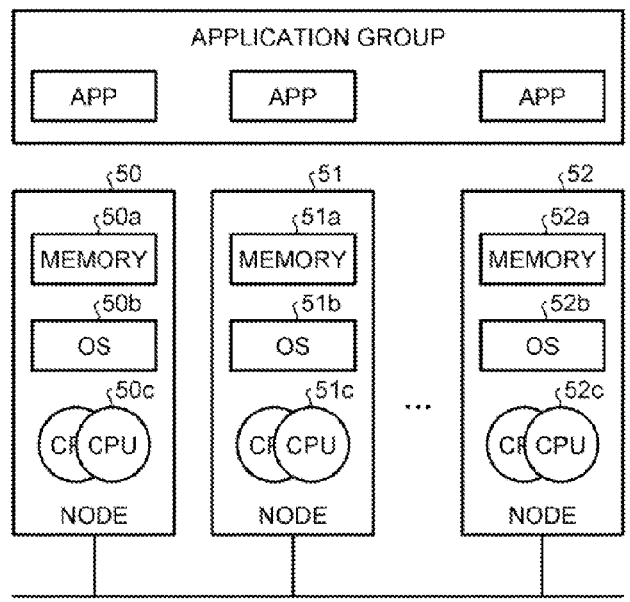
FIG. 33 is a schematic diagram illustrating an information processing system having the cluster configuration.
Figure 34:
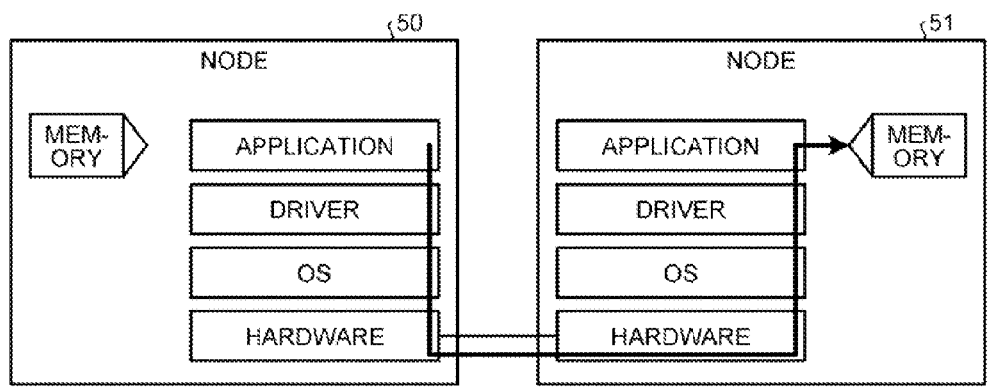
FIG. 34 is a schematic diagram illustrating memory access between nodes.
Figure 35:
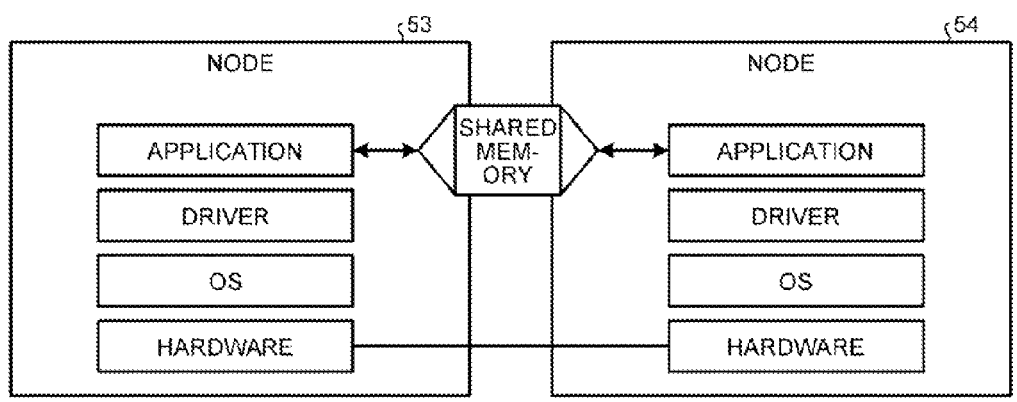
FIG. 35 is a schematic diagram illustrating an information processing system that uses a shared memory configuration technology.
Figure 36:
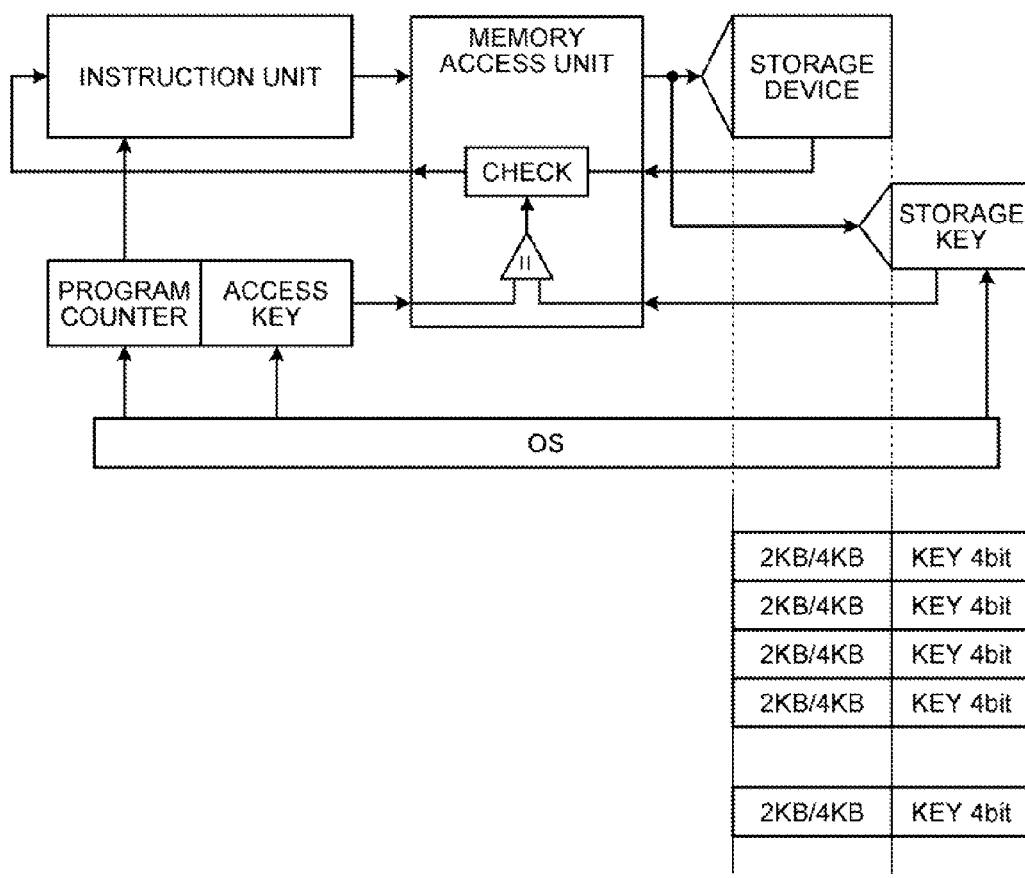
FIG. 36 is a schematic diagram illustrating a function for preventing unauthorized memory access.
Figure 37A:
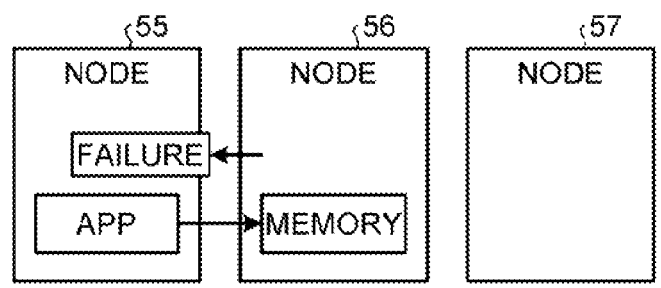
FIG. 37A is a first schematic diagram illustrating an example in which a failover is not normally performed.
Figure 37B:
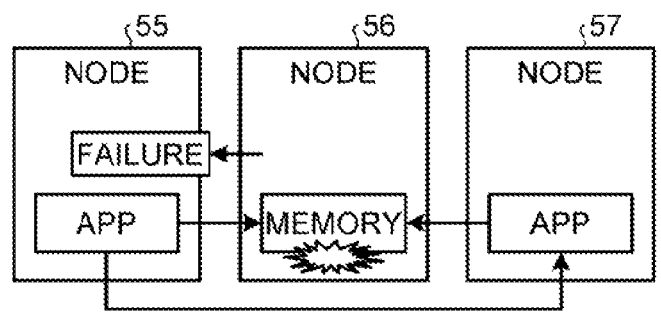
FIG. 37B is a second schematic diagram illustrating an example in which a failover is not normally performed.

For example, FIG. 32 is a schematic diagram illustrating a memory token checker that permits only a previously permitted node to perform memory access. In the example illustrated in FIG. 32, in addition to the memory token register 38*b*, a memory token checker 38*g* includes a node determination circuit 38*h* and the node determination circuit 38*h* includes a node list register 38*i*. At this point, a node ID of a node that is allowed to be accessed is stored in the node list register 38*i* for each segment region.

The node list register 38*i* outputs, from the address of the segment corresponding to the target of the memory access request, the node ID of the node that is allowed to be accessed. Then, the node determination circuit 38*h* outputs, to the access determination controller 38*d*, a node ID match indicating whether the node ID that has been output by the node list register 38*i* matches the node ID of the node that is the issue source of the memory access request.

Then, if the token enable indicates "Yes (1)" and if the "MY Node HIT", the token match, the node ID match, and the access free are all "0", the access determination controller 38*d* does not permit to execute the memory access request. In a case other than these, the access determination controller 38*d* permits to execute the memory access request. As described above, the CPU 12 can prevent unauthorized access by checking a node ID.

According to an aspect of the embodiments, a failover is correctly performed in a shared memory configuration.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
   a first node that includes a first storing unit configured to store first identification information; and
   a second node that includes a second storing unit configured to store second identification information and includes a shared memory, the second node being coupled with the first node via an interconnect, wherein
   the first node includes a first processor including a transmitting unit that transmits a request for requesting an access to the shared memory, by attaching address information of the shared memory and the first identification information, and
   the second node includes a determining unit that determines whether or not an access to the shared memory is permitted based on the second identification information and the first identification information that is included in the request transmitted from the first node,
   the first processor further includes a cache memory that retains data obtained from the shared memory, and
   the first processor writes the data retained by the cache memory back to the shared memory in the second node when the determining unit in the second node rejects an access of the request for transferring data from the shared memory to the cache memory.

2. The information processing apparatus according to claim 1, wherein
   the second node further includes a second processor that notifies identification information corresponding to the second identification information to the first node, and the first processor stores the identification information notified from the second processor to the first storing unit.

3. The information processing apparatus according to claim 2, further comprising a third node that includes a third processor, wherein
the second processor further executes:
updating the second identification information when an error corresponding to the first node is detected;
notifying identification information corresponding to the updated second identification information to the third processor that accesses the shared memory; and
the determining unit does not permit an access of the request transmitted from the first node when the first identification information included in the request does not correspond to the second identification information.

4. The information processing apparatus according to claim 1, wherein
the determining unit permits an access of the request for writing back the data retained by the cache memory included in the first processor in the first node to the shared memory in the second node without a determination based on the second identification information and the first identification information included in the request.

5. The information processing apparatus according to claim 4, wherein
the request further includes third identification information that indicates access type of the request; and
the determining unit permits an access of the request without a determination based on the first identification information and the second identification information when the third identification information included in the request transmitted from the first node indicates writing back the data retained by the cache memory to the shared memory.

6. The information processing apparatus according to claim 1, wherein
the shared memory includes a plurality of segments each having a predetermined size;
the second storing unit stores a plurality of pieces of the second identification information each of which corresponds to one of the plurality of the segments included in the shared memory; and
the determining unit determines whether or not an access to the shared memory is permitted based on the first identification information and the second identification information corresponding to the address information included in the request.

7. The information processing apparatus according to claim 6, wherein
the plurality of segments included in the shared memory includes:
a protect area with which an access protection based on the first identification information and the second identification information is performed by the determining unit; and
a non-protect area with which the access protection is not performed, and
the determining unit determines whether or not an access to the protect area of the shared memory is permitted based on the second identification information corresponding to the protect area and the first identification information that is included in the request transmitted from the first node.

8. The information processing apparatus according to claim 7, wherein the second processor stores specific identification information, as the second identification information corresponding to the non-protect area, to the second storing unit, and
the determining unit permits the access of the request for accessing the non-protect area from the first node without a determination based on the first identification information and the second identification information when the second identification information corresponding to the segment to which the request accesses is the specific identification information.

9. An access control method executed by an information processing apparatus including a first node and a second node, the first node including a first processor, the second node being coupled with the first node via an interconnect and including a shared memory and a determining unit configured to determine an access permission to the shared memory, the access control method comprising:
transmitting, using the first processor, a request for requesting an access to the shared memory, by attaching address information of the shared memory and first identification information;
determining, using the determining unit, whether or not an access to the shared memory is permitted based on second identification information and the first identification information that is included in the request transmitted from the first node, the second identification information corresponding to the shared memory and being set in advance; and
writing, using the first processor that includes a cache memory retaining data obtained from the shared memory, the data retained by the cache memory back to the shared memory in the second node when the determining unit in the second node rejects an access of the request for transferring data from the shared memory to the cache memory.

10. The access control method according to claim 9, further comprising:
notifying, using a second processor included in the second node, identification information corresponding to the set second identification information to the first node, and
utilizing, using the first processor, the identification information notified from the second processor as the first identification information.

11. The access control method according to claim 9, further comprising:
updating, using a second processor included in the second node, the second identification information when an error corresponding to the first node is detected;
notifying, using the second processor, identification information corresponding to the updated second identification information to a third processor included in a third node, the third processor accessing the shared memory; and
rejecting, using the determining unit, an access of the request transmitted from the first node when the first identification information included in the request does not correspond to the second identification information.

12. The access control method according to claim 9, further comprising:
permitting, using the determining unit, an access of the request for writing back the data retained by the cache memory included in the first processor in the first node to the shared memory in the second node without a determination based on the second identification information and the first identification information included in the request.

13. The access control method according to claim 12, further comprising
permitting, using the determining unit, an access of the request without a determination based on the first identification information and the second identification information when third identification information included in the request transmitted from the first node indicates writing back the data retained by the cache memory to the shared memory.

14. The access control method according to claim 9, further comprising:
setting, using the second processor, a plurality of pieces of the second identification information each of which corresponds to one of a plurality of segments included in the shared memory;
determining, using the determining unit, whether or not an access to the shared memory is permitted based on the first identification information and the second identification information corresponding to the address information included in the request.

15. The access control method according to claim 14, further comprising:
setting, using the second processor, a protect area for one of the segments and a non-protect area for another one of the segments, the protect area being an area with which an access protection based on the first identification information and the second identification information is performed by the determining unit, the non-protect area being an area with which the access protection is not performed; and
determining, using the determining unit, whether or not an access to the protect area of the shared memory is permitted based on the second identification information corresponding to the protect area and the first identification information that is included in the request transmitted from the first node.

16. The access control method according to claim 15, wherein
setting, using the second processor, specific identification information as the second identification information corresponding to the non-protect area; and
permitting, using the determining unit, the access of the request for accessing the non-protect area from the first node without a determination based on the first identification information and the second identification information when the second identification information corresponding to the segment to which the request accesses is the specific identification information.

* * * * *